(12) United States Patent
Poston et al.

(10) Patent No.: US 8,209,605 B2
(45) Date of Patent: Jun. 26, 2012

(54) METHOD AND SYSTEM FOR FACILITATING THE EXAMINATION OF DOCUMENTS

(75) Inventors: Timothy Poston, Karmataka (IN); Tomer Shalit, Holmsund (SE); Mark Dixon, Skärholmen (SE)

(73) Assignee: Pado Metaware AB, Holmsund (SE)

( * ) Notice: Subject to any disclaimer, the term of this patent is extended or adjusted under 35 U.S.C. 154(b) by 1111 days.

(21) Appl. No.: 11/954,450

(22) Filed: Dec. 12, 2007

(65) Prior Publication Data

US 2008/0148147 A1    Jun. 19, 2008

Related U.S. Application Data

(60) Provisional application No. 60/869,733, filed on Dec. 13, 2006.

(51) Int. Cl.
*G06F 17/00* (2006.01)
(52) U.S. Cl. .................................................. 715/273
(58) Field of Classification Search ................... 715/273
See application file for complete search history.

(56) References Cited

U.S. PATENT DOCUMENTS

| | | | |
|---|---|---|---|
| 5,220,657 A | 6/1993 | Bly et al. | |
| 5,758,347 A | 5/1998 | Lo et al. | |
| 5,862,346 A | 1/1999 | Kley et al. | |
| 5,893,908 A | 4/1999 | Cullen et al. | |
| 5,983,241 A | 11/1999 | Hoshino | |
| 6,088,694 A | 7/2000 | Burns et al. | |
| 6,216,175 B1 | 4/2001 | Sliger et al. | |
| 6,513,050 B1 | 1/2003 | Williams et al. | |
| 6,549,944 B1 * | 4/2003 | Weinberg et al. | 709/224 |
| 6,643,621 B1 | 11/2003 | Dodrill et al. | |
| 6,848,078 B1 | 1/2005 | Birsan et al. | |
| 6,966,001 B2 | 11/2005 | Obara et al. | |
| 7,533,133 B1 | 5/2009 | Lanzatella et al. | |
| 7,882,072 B1 | 2/2011 | Axe et al. | |
| 2002/0010702 A1 | 1/2002 | Ajtai et al. | |
| 2002/0019827 A1 | 2/2002 | Shiman et al. | |
| 2002/0169740 A1 | 11/2002 | Korn | |
| 2003/0066028 A1 | 4/2003 | Payne et al. | |
| 2003/0110211 A1 | 6/2003 | Danon | |
| 2003/0163801 A1 | 8/2003 | Thames et al. | |

(Continued)

OTHER PUBLICATIONS

Yoshikawa, et al., "XRel: A Path-Based Approach to Storage and Retrieval of XML Documents Using Relational Databases" ACM Transactions on Internet Technology, vol. 1, No. 1, Aug. 2001, pp. 110-141.*

(Continued)

*Primary Examiner* — Amelia Rutledge
(74) *Attorney, Agent, or Firm* — Nixon & Vanderhye P.C.

(57) ABSTRACT

The user is enabled to move smoothly between viewing an entire document in a word by word display, through views that display only elements of increasing landmark value, to an overview of the document in a single display window. A document is parsed into a hierarchy, of which each node at every level (from chapter to sentence, clause or long word) has a display state (invisible, tokenized or open) for the way it is shown as part of an expandable view of the document. The contents opted for display within a tokenized view may be prioritized according to a system of landmark values. The view is modified by user input using an explicit data structure of nodes and states within the device controlling the display, or by structuring in another system the underlying logic of the arrangement of code that is acted upon by a web browser.

21 Claims, 17 Drawing Sheets

U.S. PATENT DOCUMENTS

| | | | |
|---|---|---|---|
| 2003/0217266 | A1 | 11/2003 | Epp et al. |
| 2004/0034688 | A1 | 2/2004 | Dunn |
| 2004/0186817 | A1 | 9/2004 | Thames et al. |
| 2004/0189713 | A1 | 9/2004 | Thames et al. |
| 2004/0199516 | A1 | 10/2004 | Thames et al. |
| 2004/0205653 | A1 | 10/2004 | Hadfield et al. |
| 2004/0268235 | A1* | 12/2004 | Wason .................. 715/513 |
| 2005/0027757 | A1 | 2/2005 | Kiessig et al. |
| 2005/0066269 | A1* | 3/2005 | Wang et al. ............ 715/513 |
| 2006/0143205 | A1* | 6/2006 | Fuchs .................. 707/101 |
| 2006/0259949 | A1 | 11/2006 | Schaefer et al. |
| 2007/0033376 | A1 | 2/2007 | Sinclair et al. |
| 2007/0055916 | A1 | 3/2007 | Prang et al. |
| 2007/0106707 | A1 | 5/2007 | Yamato |
| 2007/0186032 | A1 | 8/2007 | Sinclair et al. |
| 2008/0028300 | A1 | 1/2008 | Krieger et al. |
| 2009/0089535 | A1 | 4/2009 | Lohmar et al. |
| 2010/0023525 | A1 | 1/2010 | Westerlund et al. |

OTHER PUBLICATIONS

U.S. Appl. No. 12/292,640, filed Nov. 21, 2008; Inventor: Poston et al.

U.S. Appl. No. 12/366,418, filed Feb. 5, 2009; Inventor: Poston et al.

U.S. Appl. No. 11/971,220, filed Jan. 9, 2008; Inventor: Poston et al.

U.S. Appl. No. 12/123,537, filed May 20, 2008; Inventor: Poston et al.

Office Action mailed Mar. 4, 2010 in co-pending U.S. Appl. No. 11/971,220.

Office Action mailed Nov. 11, 2010 in co-pending U.S. Appl. No. 11/971,220.

Office Action mailed Dec. 7, 2010 in co-pending U.S. Appl. No. 12/123,537.

S. Needleman et al., *A general method applicable to the search for similarities in the amino acid sequence of two Proteins,* J Molec. Biol. 48(3): 443-53 (1970).

T F Smith et al., *Identification of Common Molecular Subsequences,* J. Molec. Biol., 147:195-197 (1981).

A. Wozniak, *Using video-oriented instructions to speed up sequence comparison,* Comput. Appl. Biosci. 13(2):145-50, 1997.

S. Kurtz, et al., *Versatile and open software for comparing large genomes,* Genome Biology (Jan. 30, 2004), Genome Biol., R12.1-R12.9.

A. L. Delcher, et al., *Fast Algorithms for Large-scale Genome Alignment and Comparison,* Nucleic Acids Research 30, 11 2478-2483(2002).

A. L. Delcher, et al., *Alignment of Whole Genomes,* Nucleic Acids Research, 27:11 (1999), 2369-2376.

Office Action mailed Mar. 14, 2011 in co-pending U.S. Appl. No. 11/971,220.

Office Action mailed May 20, 2011 in co-pending U.S. Appl. No. 12/366,418.

Office Action mailed Aug. 17, 2011 in co-pending U.S. Appl. No. 12/292,640.

* cited by examiner

200

IN CONGRESS, July 4, 1776

The unanimous Declaration of the thirteen united States of America

When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

220

He has refused his Assent to Laws, the most wholesome and necessary for the public good.
He has forbidden his Governors to pass Laws of immediate and pressing importance, unless suspended in their operation till his Assent should be obtained; and when so suspended, he has utterly neglected to attend to them.
He has refused to pass other Laws for the accommodation of large districts of people, unless those people would relinquish the right of Representation in the Legislature, a right inestimable to them and formidable to tyrants only.
He has called together legislative bodies at places unusual, uncomfortable, and distant from the depository of their public Records, for the sole purpose of fatiguing them into compliance with his measures.
He has dissolved Representative Houses repeatedly, for opposing with manly firmness his invasions on the rights of the people.
He has refused for a long time, after such dissolutions, to cause others to be elected; whereby the Legislative powers, incapable of Annihilation, have returned to the People at large for their exercise; the State remaining in the mean time exposed to all the dangers of invasion from without, and convulsions within.
He has endeavoured to prevent the population of these States; for that purpose obstructing the Laws for Naturalization of Foreigners; refusing to pass others to encourage their migrations hither, and raising the conditions of new Appropriations of Lands.
He has obstructed the Administration of Justice, by refusing his Assent to Laws for establishing Judiciary powers.
He has made Judges dependent on his Will alone, for the tenure of their offices, and the amount and payment of their salaries.
He has erected a multitude of New Offices, and sent hither swarms of Officers to harrass our people, and eat out their substance.
He has affected to render the Military independent of and superior to the Civil power.
He has combined with others to subject us to a jurisdiction foreign to our constitution, and unacknowledged by our laws; giving his Assent to their Acts of pretended Legislation:
For Quartering large bodies of armed troops among us:
For protecting them, by a mock Trial, from punishment for any Murders which they should commit on the Inhabitants of these States:
For cutting off our Trade with all parts of the world:
For imposing Taxes on us without our Consent:
For depriving us in many cases, of the benefits of Trial by Jury:
For transporting us beyond Seas to be tried for pretended offences:
For abolishing the free System of English Laws in a neighbouring Province, establishing therein an Arbitrary government, and enlarging its Boundaries so as to render it at once an example and fit instrument for introducing the same absolute rule into these Colonies:
For taking away our Charters, abolishing our most valuable Laws, and altering fundamentally the Forms of our Governments:
For suspending our own Legislatures, and declaring themselves invested with power to legislate for us in all cases whatsoever.
He has abdicated Government here, by declaring us out of his Protection and waging War against us.
He has plundered our seas, ravaged our Coasts, burnt our towns, and destroyed the lives of our people.
He is at this time transporting large Armies of foreign Mercenaries to compleat the works of death, desolation and tyranny, already begun with circumstances of Cruelty & perfidy scarcely paralleled in the most barbarous ages, and totally unworthy the Head of a civilized nation.
He has constrained our fellow Citizens taken Captive on the high Seas to bear Arms against their Country, to become the executioners of their friends and Brethren, or to fall themselves by their Hands.
He has excited domestic insurrections amongst us, and has endeavoured to bring on the inhabitants of our frontiers, the merciless Indian Savages, whose known rule of warfare, is an undistinguished destruction of all ages, sexes and conditions.

In every stage of these Oppressions We have Petitioned for Redress in the most humble terms: Our repeated Petitions have been answered only by repeated injury. A Prince whose character is thus marked by every act which may define a Tyrant, is unfit to be the ruler of a free people.

Nor have We been wanting in attentions to our British brethren. We have warned them from time to time of attempts by their legislature to extend an unwarrantable jurisdiction over us. We have reminded them of the circumstances of our emigration and settlement here. We have appealed to their native justice and magnanimity, and we have conjured them by the ties of our common kindred to disavow these usurpations, which, would inevitably interrupt our connections and correspondence. They too have been deaf to the voice of justice and of consanguinity. We must, therefore, acquiesce in the necessity, which denounces our Separation, and hold them, as we hold the rest of mankind, Enemies in War, in Peace Friends.

We, therefore, the Representatives of the united States of America, in General Congress, Assembled, appealing to the Supreme Judge of the world for the rectitude of our intentions, do, in the Name, and by Authority of the good People of these Colonies, solemnly publish and declare, That these United Colonies are, and of Right ought to be Free and Independent States; that they are Absolved from all Allegiance to the British Crown, and that all political connection between them and the State of Great Britain, is and ought to be totally dissolved; and that as Free and Independent States, they have full Power to levy War, conclude Peace, contract Alliances, establish Commerce, and to do all other Acts and Things which Independent States may of right do. And for the support of this Declaration, with a firm reliance on the protection of divine Providence, we mutually pledge to each other our Lives, our Fortunes and our sacred Honor.

IN CONGRESS, July 4, 1776

The unanimous... America

When in the Course... the separation.

We hold these truths... Creator... Rights... Life, Liberty... Happiness. That to secure... consent of the governed, That... Form of Government... Right of the People... Government,... Safety and Happiness. Prudence,... causes; and accordingly... accustomed. But when... Object... Despotism,... Government,... future security. Such has... Colonies; and such... Systems of Government. The history... King of Great Britain... Tyranny over these States. To prove this,... candid world.

He has refused... public good. 321  321  321  321

He has forbidden... Governors... Laws... Assent should be obtained; and... attend to them.

He has refused... Laws... Representation in the Legislature... tyrants only.  320
He has called... Records... his measures.
He has dissolved Representative Houses... rights of the people.
He has refused... Annihilation... People... convulsions within.
He has endeavoured... Laws for Naturalization of Foreigners... Appropriations of Lands.
He has obstructed the Administration of Justice... Assent to Laws... Judiciary powers.
He has made Judges... Will... their salaries.
He has erected... New Offices... Officers... their substance.
He has affected... Military... Civil power.
He has combined... Assent... Acts of pretended Legislation:
For Quartering... among us:
For protecting... Trial... Murders... Inhabitants of these States:
For cutting... Trade... the world:
For imposing Taxes... Consent:
For depriving Trial by Jury:
For transporting... Seas... offences:
For abolishing... English Laws... Province... Arbitrary... Boundaries... these Colonies:
For taking... Charters... Laws... Forms of our Governments:
For suspending... Legislatures... cases whatsoever.
He has abdicated Government here... Protection... against us.
He has plundered... Coasts... lives of our people.
He is at this time... Armies... Mercenaries... Cruelty... nation.
He has constrained... Citizens... Captive... Seas... Arms... Country... Brethren... their Hands.
He has excited... Indian Savages... sexes and conditions.  330

In every stage... Oppressions We have Petitioned for Redress... terms: Our... Petitions...  340
injury. A Prince... Tyrant... free people.

Nor have We... Brittish brethren. We have warned... jurisdiction over us. We have reminded ... settlement here. We have appealed... usurpations... correspondence. They too have been deaf... consanguinity. We must... Separation... Enemies in War, in Peace Friends.

We, therefore, the Representatives... States of America, in General Congress, Assembled,... Supreme Judge... Name, and by Authority... People of these Colonies,..., That these United Colonies... Right... Free and Independent States;... Absolved from all Allegiance to the British Crown... State of Great Britain,... dissolved;... Free and Independent States... Power... War... Peace... Alliances... Commerce... Acts and Things which Independent States may of right do. And for... Declaration... Providence... Lives, our Fortunes and our sacred Honor.

```
IN CONGRESS, July 4, 1776
The unanimous... America
When in the Course... the separation.
We hold these truths... Creator... Rights... Prudence,... King ... Tyranny... candid world.
He has refused... Annihilation... Judges... Murders... Jury:... Cruelty... sexes and conditions.
In every stage... Petitioned ... Prince... Tyrant... free people.      430                         440
Nor have We... usurpations... Enemies in War, in Peace Friends.
We, therefore, ... British Crown... Independent... Lives, our Fortunes and our sacred Honor.
```

```
IN CONGRESS, July 4, 1776
The unanimous... America
When in the Course... the separation.
We hold these truths... Creator... Rights... Prudence,... King ... Tyranny... candid world.
He has refused... Annihilation... Judges... Murders... Jury:... Cruelty... sexes and conditions.
In every stage... Petitioned ... Prince... Tyrant... free people.                          530
Nor have We... Brittish brethren. We have warned... jurisdiction over us. We have reminded
... settlement here. We have appealed... usurpations... correspondence. They too have been
deaf... consanguinity. We must... Separation... Enemies in War, in Peace Friends.
We, therefore,... British Crown... Independent... Lives, our Fortunes and our sacred Honor.
```

IN CONGRESS, July 4, 1776

The unanimous... America

When in the Course... the separation.

We hold these truths... Creator... Rights... Prudence,... King ... Tyranny... candid world.

He has refused... Annihilation... Judges... Murders... Jury:... Cruelty... sexes and conditions.

In every stage... Petitioned ... Prince... Tyrant... free people. 640

Nor have We... Brittish brethren. We have warned... jurisdiction over us. We have reminded ... settlement here. We have appealed... usurpations... correspondence. They too have been deaf... consanguinity. We must... Separation... Enemies in War, in Peace Friends.

We, therefore, the Representatives... States of America, in General Congress, Assembled,... Supreme Judge... Name, and by Authority... People of these Colonies,..., That these United Colonies... Right... Free and Independent States;... Absolved from all Allegiance to the British Crown... State of Great Britain,... dissolved;... Free and Independent States... Power... War... Peace... Alliances... Commerce... Acts and Things which Independent States may of right do. And for... Declaration... Providence... Lives, our Fortunes and our sacred Honor.

OmniPad business plan

We here present ... shareholder value

1. Executive summary
...
2. Background and need
...
3. The product
...
4. The business model: Software-as-a-Service (SaaS)
...
5. The market
...
6. Competitors
...
7. Development Strategy

1010

8. Patents and technology

The core method of CoAuthor, ChangeFinder, is inspired by techniques used in bioinformatics for identifying common gene strings in extremely long data sequences.

As each new revision of a document is uploaded to the server, the method creates a structured representation of the document and document changes that can be stored and used later by authors for creating new revisions.

The method is computationally complex, but since it only needs to be performed once per revision, and at the time of upload, this will not affect system responsiveness. The method is also highly scalable and can be distributed over a large number of servers. The ChangeFinder method will be patented in the US and (pending legal advice), also in the EU.

9. The Team
...
10. Execution
...
11. Funding and growth
...
12. Exit strategy
...
13. Ownership
...

FIG. 10

THE FORM OF SOLEMNIZATION OF MATRIMONY

¶ *The laws respecting Matrimony, whether by publishing the Banns in churches, or by License, being different in the several States, every Minister is left to the direction of those laws, in every thing that regards the civil contract between the parties.* ¶ *And when the Banns are published, it shall be in the following form:*
I publish the Banns of Marriage... impediment,... Matrimony... time of asking.

¶ *At the day... Solemnization of Matrimony, the Persons... Church,... Man... Woman... Minister shall say.*
DEARLY beloved, we are gathered... God,... Man and this Woman in holy Matrimony; which is an honourable estate, instituted of God in the time of man's innocency, signifying unto us the mystical union that is betwixt Christ and his Church: which holy estate Christ adorned and beautified with his presence and first miracle that he wrought in Cana of Galilee, and is commended of Saint Paul to be honourable among all men: and therefore... entered into unadvisedly or lightly; but reverently, discreetly, advisedly, soberly, and in the fear of God.
Into this holy estate... to be joined. If any man... just cause,... lawfully be joined... hold his peace.

¶ *And also speaking unto the Persons who are to be married, he shall say,* —1512
I REQUIRE and charge you both, (as ye will answer at the dreadful day of judgment when the secrets of all hearts shall be disclosed), that if either of you know any impediment why ye may not be lawfully joined together in Matrimony, ye do now confess it.
For be ye well assured,... marriage is not lawful.

¶ *The Minister, if... proposed Marriage.... his indemnification: but if no impediment... Minister... to the Man.*
M. WILT thou have this Woman... wife,... God's ordinance... Matrimony? Wilt thou love her, comfort her honour,... sickness and in health; and, forsaking... both shall live?

¶ *The Man shall answer.*
I will.

¶ *Then shall the Minister say.*
Who giveth this Woman to be married to this Man? 1513

¶ *Then shall they give their troth to each other in this manner.*

¶ *The Minister, receiving the Woman at her father's or friend's hands, shall cause the Man with his right hand to take the Woman by her right hand, and to say after him as followeth.*
I M. take... wedded wife,... God's holy ordinance;... plight thee my troth.

¶ *Then shall they loose... Woman ... Man ... say after the Minister:*
I N. take... wedded husband,... God's holy ordinance;... give thee my troth.

¶ *Then shall they... Man... Woman a Ring. And the Minister... Ring... Man.... Woman's left hand. And the Man... say.*
WITH this Ring I thee wed,... Name of the Father, and of the Son, and of the Holy Ghost. Amen.

¶ *Then the Man, leaving the Ring upon the fourth finger of the Woman's left hand, the Minister shall say,*
Let us pray
OUR Father who art in heaven... deliver us from evil. Amen.

O ETERNAL God,... Jesus Christ our Lord. Amen.

¶ *Then shall the Minister join their right hands together, and say,*
Those whom God hath joined... Man and Wife,... life everlasting. Amen.

Manifesto of the Communist Party

A spectre is haunting Europe... exorcise... French Radicals and German police-spies. Where is the party... branding reproach of communism... reactionary adversaries? Two things result from this fact:

I. Communism is already acknowledged by all European powers to be itself a power.
II. It is high time that Communists... nursery tale... manifesto of the party itself.
To this end, Communists... assembled in London... manifesto... Danish languages.

1: Bourgeois and Proletarians _1610_
The history ... naked, shameless, direct, brutal exploitation... holy is profaned... ever expanding union of the workers... victory of the proletariat are equally inevitable.

2: Proletarians and Communists _1611_
In what relation... Abolition of private property... mere training to act as a machine... Abolition of the family!... working men have no country... free development of all.

3: Proletarians and Communists _1612_
    Reactionary Socialism 1620
    Conservative or Bourgeois Socialism 1621    _1613_
    Critical-Utopian Socialism and Communism 1622

4: Position of the Communists in... Various Existing Opposition Parties
Section II... petty bourgeoisie... developed proletariat... support every revolutionary movement... nothing to lose but their chains... Working Men of All Countries, Unite!

FIG. 16

Manifesto of the Communist Party

A spectre is haunting Europe -- the spectre of communism. All the powers of old Europe have entered into a holy alliance to exorcise this spectre: Pope and Tsar, Metternich and Guizot, French Radicals and German police-spies.

Where is the party in opposition that has not been decried as communistic by its opponents in power? Where is the opposition that has not hurled back the branding reproach of communism, against the more advanced opposition parties, as well as against its reactionary adversaries?

Two things result from this fact:

I. Communism is already acknowledged by all European powers to be itself a power.

II. It is high time that Communists should openly, in the face of the whole world, publish their views, their aims, their tendencies, and meet this nursery tale of the Spectre of Communism with a manifesto of the party itself.

To this end, Communists of various nationalities have assembled in London and sketched the following manifesto, to be published in the English, French, German, Italian, Flemish and Danish languages.

1: Bourgeois and Proletarians

2: Proletarians and Communists

3: Socialist and Communist Literature

4: Position of the Communists in... Various Existing Opposition Parties

FIG. 17

METHOD AND SYSTEM FOR FACILITATING THE EXAMINATION OF DOCUMENTS

This application claims the benefit of provisional Application No. 60/869,733, filed Dec. 13, 2006, the entire contents of which are hereby incorporated by reference.

BACKGROUND OF THE INVENTION

Zooming versus index and contents Faced with complex material, one wants to see both detail and an overview. For the surface of our planet, Google Earth (http://earth.google.com/) perfectly exemplifies 'zooming', which gives smooth transition from an overview to finer and finer detail, or from a close-up to broader and broader context. One can use its search index: type in India or Bangalore and the map will slide and expand to those locations. The interface is designed, however, for a more natural and more powerful navigation. Use the mouse to slide the globe around, the scroll wheel or a slider to shrink or grow the view. One navigates by visible landmarks: go eastward past the bulk of Africa to the triangle of the sub-continent, zoom toward the visible tip, and cities start to appear. They appear first, while still too small to notice in a satellite photograph, as labels. A label, like an entry in an index or a table of contents, is text, but it is text in the same place as the item it identifies.

The usual view of a document does not allow this kind of exploration. The most widely used editor has a function called "zoom", but while layout is clear with eight pages shrunk to one window (Drawing 1), all content is hidden. (Even with a far higher resolution display, most eyes would fail to read it.) One cannot at a glance identify the appearance of an important character, or a chapter on buttons. One cannot move swiftly past an immediately identified main part to the start of another: in Drawing 1 one must choose a page to enlarge and examine the text. In full-sized text one must scroll or leaf through, looking for the page with the actual title of the second part, or perhaps a change of page headers. (Published books too often use the book title as a page header, unchanging and thus useless within the book. Many digital documents have no headers at all.)

One sometimes has a table of contents (TOC), which in hard copy sets one leafing through for a page number. Digitally one can sometimes click for a direct jump, but the TOC remains a separated set of a few pointers, not a visibly embedded system of markers. Useful as it is when a good TOC is provided by the author, it remains a separated piece of apparatus. Quoting Microsoft Office Help, "When you click a heading in the Document Map, Microsoft Word jumps to the corresponding heading in the document, displays it at the top of the window," not centered in its before-and-after context, "and highlights the heading in the Document Map." It is thus an external piece of apparatus controlling what is seen in the document proper, which is shown in uncompressed detail. The TOC display permits some zooming ("You can choose the level of detail to display in the Document Map. For example, you can display all headings or only top-level headings, or show or hide detail for individual headings. You can also set the font and size of the headings in the Document Map and change the highlight color of the active heading."). The document itself does not. The inability of the Document Map to zoom locally—for example showing all top-level headings, but the next level only for one section—is not inevitable with this approach: the similar "navigation pane" of Adobe Acrobat Reader allows local expansion. However, seeing the actual text uncompressed is a constant. One can thus compare (for instance) two paragraphs separated by more than a page of text only if one splits the window, losing a sense of what lies between them. Even in the separate TOC, the two locations are not simultaneously shown.

Indexing and Contents The functions of an Index and a TOC are quite distinct. An Index exists to help find specific items. A TOC is for general navigation. Readers complain if only an Index is present: the Index directs them well to where a key word is mentioned, but poorly to where a concept is discussed. The typical user interface, rather than exploit digital means to provide better navigation than both of these, is weaker than either. There is a need for something better than both.

For any digital document, whether on line or local, the Search function serves as a kind of Index. In one sense it is faster than an Index to use (click and arrive at a text location of the term), but it is usually necessary to type the search term, rather than to simply see it. No list is there to glance over. This means both that an American may search a UK document (not identified as British by the Web) for "color" or "windshield", missing its mentions of "colour" or "windscreen", and that one cannot look over a word list to get a sense of the topics discussed. The way that an Index half-substitutes for a TOC is lost. Neither bit of apparatus has ever been helpful in looking through the text itself for a remembered discussion, though each is sometimes helpful in suggesting a place to start looking. (A major motif in The Feynman Lectures on Physics is frequent use of the mathematics of two coupled oscillators, but this threads through the chapters, is not a recurring heading, and is hard to trace in the Index.)

Automatic indexing is becoming available (see for example http://www.eprecis.com), but this does not replace the TOC. For example, suppose one wishes to know how volume data such as CT scans are turned into viewable images, and one suspects that a large Medical Imaging document, currently open, discusses this. A search for 'volume', or an Index, will yield hits on 'volume' as in a book, hits on 'volume' of sound, hits (often in an imaging context) of the volume of blood pushed out by a heartbeat, hits on 'large volume of data', hits on the desired discussion, and hits on how the creation of such viewable images is used—in brain surgery, for instance—rather than on how the creation is achieved. If one knows the technical term 'volume rendering' for the creation, one can avoid the first four classes of unwanted hit, but not the last. Moreover, using either a connected "volume rendering" search term, or the words as a separable pair, one misses a sentence like "We must render the data as a viewable image". Some book indices use boldface or underlining to mark the more important occurrences and/or the defining occurrence, but this is far beyond what a digital search tool can do. What we are left with as a TOC substitute is somewhat weaker than a paper Index, which for books is already inadequate.

Structural navigation To state the value of a TOC more explicitly, it outlines the structure of a document (rather than present the document as a random-access heap of paragraphs). It does not show the document itself within that view, as a planet is part of the overview from space. Such structure is often important. There are web pages that make significant use of XML, reshuffling output according to users' needs, but they remain few. This is due at times to the difficulty of true hypertext construction, but often to the fact that it is unwise. Humans are used to structured narrative, whether in a tale with events, or a logical account of a body or knowledge. An opera is poorly represented by the favourite arias from it, out of context. One of the most dramatic speeches in Macbeth occurs when a confused messenger tells Macbeth that "As I did stand my watch upon the hill, I look'd toward Birnam, and anon, methought, The wood began to move." This is gibberish to someone who does not know of the witches, or what they said to Macbeth, or why he went to them. Starting here, his reacting with death threats and despair is incomprehensible. A hypertextual edition could link to a witch's telling him "Macbeth shall never vanquish'd be, until Great Birnam wood to high Dunsinane hill shall come against him," and gradually the reader untangles the logic, with about as much pleasure as in reading a detective story backwards. A play or a novel or an exposition can often have a sequential structure, which the reader needs both to appreciate and to use, in finding wanted material. There is a function of 'leafing through' to appreciate that structure, and place material in context, that is not replaced by point search.

One traditional display of structure, beside the TOC, is 'running heads', at the top of a page. Even when these merely reproduce a heading from the TOC, they make exploration easier, but a TOC is not always available. The King James Version of the Bible even more helpfully points to matters within each page: "A cloud guideth the Israelites" or "Christ feedeth five thousand". It would be hard algorithmically to reproduce such headings, via natural language processing (NLP) to decide what is happening, what is most important, and how to describe it. These are matters of judgement and interpretation. (The page from the Song of Songs with "he shall lie all night between my breasts" is headed "Christ's love to the Church". Since neither of the nouns Christ or Church appears within the page, complex contextual reasoning was needed to arrive at this heading.) Such exegesis is beyond the current scope of computing devices, and to add it by hand to every document extant or in draft is impractical. Ideally, one would summarise the material at various levels (chapter, section, paragraph . . . ) Digital summarization is a vigorous research area, but asked to compress the paragraph above by 75%, a typical application (http://home.hccnet.nl/m.b.wieling/autosummarizer.html) produces "A hypertextual edition could link to a witch's telling him "Macbeth shall never vanquish'd be, until Great Birnam wood to high Dunsinane hill shall come against him," and gradually the reader untangles the logic, with about as much pleasure as reading a detective story backwards. There is a function of 'leafing through' to appreciate that structure, and place material in context, that is not replaced by point search." The identical result is created by the 'AutoSummarize' tool in Microsoft™ Word, at the same size setting.

As a summary, this is barely readable without reference to the original text. Its first sentence makes us ask "telling whom?", since the "to Macbeth . . . he went . . . his reacting" chain of pronoun consistency following a by-name reference is lost. After previous paragraph in full, it would read strangely: it no longer mentions the value of a TOC, that paragraph's stated theme (which similarly vanishes in a 75% reduction). As a summary, this just does not work. Human glances at the original would provide better understanding, faster. Key sentences vanish for reasons of space, and vanish without trace because mere traces can never be autonomously comprehensible. The sentences that remain, however, both fail in comprehensibility for lack of context, and occupy too much space for an overview.

There is thus a need for automatic assistance in viewing documents that does not rely on unavailable automatic summarization, and that does not have self-contained comprehensibility as a goal, but rather focuses on navigation within the document. This is notably relevant where a reader needs to decide which part to read more carefully, or to edit text (perhaps as one among a group of writers), rather than read for the first time. A re-reading user knows most of what is being said, but can find it hard to track where it is said, with changes in the presentation or the flow of argument.

Moreover, contrary to the ambitions of software designers, many documents have headings and titles that are not marked according to any but a visual standard. Document scanning software often includes optical character recognition (OCR) to turn pixel images of letters into searchable strings of standard codes for letters, but optical layout recognition that classifies headers is rarer. A $L_AT_EX$ document usually does have entries like \section{Background of the Invention} which produce not only headers but TOC entries. Web page creators often avoid the HTML level-2 header <H2>Background of the Invention</H2> and use <br><br><big><b>Background of the Invention</b></big><br>, which directly specifies a double line break followed by four large words in bold face, on a separate line: similar 'mere typography' is common in ".doc" files, using only the boldface and size tools and the carriage return, without entering a named section break. This is particularly natural when creating a document with a "what you see is what you get" (WYSIWG) editor, since the user may not see a difference. It happens equally with authors who never learn that the sectioning apparatus exists, or cannot decipher the manual, and with authors whose revulsion at the visual results of a program's layout scheme makes them prefer direct control. ($L_AT_EX$, used by technically minded authors who do learn such things, produces relatively clean results. Its \section{ } command is more regularly used.)

A related application ("A Method and System for Facilitating the Production of Documents", by the same inventors, hereby incorporated by reference) teaches the utility of a 'zoomed out' single-page display in which it is made clear—for instance—where a moved paragraph was, versus where the paragraph is now. To construct such a view is the aim of the present invention. The detection, presentation and management of changes, in some embodiments using a view constructed as here disclosed, is the scope of its companion.

An analogy is of interest here, between DNA as recorded and used in a genome database, and as used in and by the living cell. One may roughly compare a base in DNA to a letter, a triplet coding for an amino acid to a word, a gene (the sequence of triplets specify a protein) to a paragraph, and the rest to whitespace and mark-up. A DNA molecule coils up to make a thicker strand, which in turns coils, and supercoils, many times until the large 'chromosome' structure is created: only a small part can uncoil at a time, given the constraints of fitting into the cell. In genome software the single most frequent action is to seek an exact or acceptable match for a given base or triplet sequence. The cell, not studying itself, has less reason for such searches. To activate a gene it uncoils a part of the chromosome, un-sub-coils a section of this, un-sub-sub-coils a subsection of this, etc.; the chromosome locally 'puffs out' until the gene itself uncoils and can be 'read' into transfer RNA and used in protein synthesis. The cell does not scan the whole chromosome each time. It efficiently navigates the hierarchy of coils, to find the paragraph it must now use, rather than to find instances of a particular sequence. Human readers of digitally stored text navigate less smoothly, 'puffing out' into a browser window far more material than they currently wish to read.

There is a need to make it easy to see what is being discussed in different parts of a text, and to zoom in and out on what is being said. Smooth and easy zooming is critical, in enabling a human reader to decide (more quickly than by skimming the full text) which parts are to be read more carefully in a literature search, a patent search, or any other task which involves a large body of documents to be quickly digested with respect to their relevance to a matter in hand. Moreover, if the user is accessing them over the Web via limited bandwidth, beginning with a zoomed-out view of text can greatly reduce waiting time. More detail should be called up as needed, and can be loaded in background and available instantly when the user has decided from the overview to ask for it.

As much of a document as possible should appear in the limited viewport a computer offers, whilst a) making structure apparent at each detail level; and b) enabling navigation between higher and lower levels of detail, globally or partially. The user should descend smoothly from a high-level view to a detailed one (as in Google Earth) and back: not point at a map to call up a separate view of a street scene. However, a document is a sequential or 1D entity, not a 2D surface, and recognizing a chapter on the Law of Least Action is very different from recognizing a high-level view of Africa. The problems and opportunities are thus very different. The present invention seeks to meet them.

BRIEF SUMMARY OF THE INVENTION

The invention (referred to as 'jooming') presents a document in a variably compressed form, designed for user navigation rather than stand-alone comprehension. Drawing 2 shows a full document 200, which fits as just-readable print on a large printed page. With the resolution of many computer displays, even using the full area of the screen rather than a subwindow, it cannot be shown as a readable entirety to glance over. (Even with high resolution, the fine print makes glancing difficult.) Drawing 3 shows a view 300 in which each sentence has been given a shorter form, but does appear. Its form is not fully intelligible (as a précis aims to be), but it is recognizable. Landmarks—words significant by various criteria—are preserved.

Clicking on an ellipsis " . . . " 321 within a sentence 320 restores the form 220 of that sentence in Drawing 2: the interface also provides means to restore the whole document to the form shown in Drawing 2, though with the currently chosen magnification or font size this enlargement may force part of it outside the display window. (Optionally, for long sentences, intermediate levels of expansion may be introduced, by a variety of means evident to those skilled in the art.)

In Drawing 4 each paragraph has a separate visible identity, but individual sentences do not. Clicking on a paragraph such as 430 restores it to the text form in which it appears 330 in Drawing 3, resulting in the view 500 (Drawing 5) where it appears as the paragraph 530. Selecting a multi-paragraph region such as 440, the whole region may be expanded to the text form in which it appears 340 in Drawing 3, resulting in the view 600 (Drawing 6) where it appears as the region 640. The user may conversely shrink part or whole of the document, by various means described further below.

A longer document normally extends beyond the paragraph/sentence/word hierarchical structure (optionally including clauses, noun clusters, etc., between the levels of sentence and word) exhibited by the document in Drawings 2 to 6. The invention takes account of this to allow views reduced to higher level landmarks, which may be titles of sections, chapters and so on, where available. The author is presumed to have included them precisely as prominent markers, and we use them as such (rather than as TOC entries), even in cases where only these markers remain visible. They are landmarks in an expandable view, not pointers to what may be found on a distant page (in a book) or a separate window (in a computer).

An embodiment of the present invention can display a document in various formats (".doc", ".pdf", plain ASCII text, marked up ASCII text, hypertext, etc.) that enable stored text to be made humanly readable, obeying varying levels of specification about the typography, optionally with non-textual inclusions of various kinds. The invention parses the document into 'nodes' consisting of chapters, sections, paragraphs, lists, items, images, animations, applets, sounds, links and sentences (optionally, with more levels) and assigns to each node a display state of 'open', 'tokenized' or 'invisible'. A node is a 'child' of another if its text is contained in text of the other, which is then its parent. It is a 'direct' child if it is a child of no other child of that node, a sibling of any other child with the same direct parent, and a leaf node if it has no child. The children of an invisible or tokenized node must be invisible. The children of an open node may be open or tokenized. The parent of a tokenized or open node must be open. An open leaf node is displayed in full, an open parent is displayed by showing its children according to their display states. A tokenized sentence is displayed by showing its first few and last few words, or words or links within it identified as likely to be important to the reader, or such other tokenization means as will be evident to one skilled in the art. The tokenized form may be fixed, or adjustable by a change in the space allocated to its display. Other tokenized text nodes are shown similarly, including their titles where these are tagged as such within the text or can be so identified by means known to one skilled in the art. Tokenized images and animations are displayed as thumbnails, tokenized sound files as icons, all with means of sampling them at a saving of download and display time.

A preferred embodiment of the present invention assigns to each word in a sentence, and to each node in a hierarchy, a landmark value computed by such criteria as, but not limited to, position in the text, capitalization, italicization, bold face or change of font. A sentence has a landmark value computed from, and increasing with, the landmark values of its words, by means such as but not limited to summation, finding their mean or median, or other methods evident to one skilled in the art, optionally in combination with criteria at the sentence level whereby a sentence has higher landmark value if it is nearer a paragraph break, or if it is brief. Similar criteria define the landmark value of a higher node.

Given the availability of these landmark values, the tokenized form of a sentence need not be a fixed string. For example, in the first sentence of the document in Drawings 2 to 6, "When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation," our preferred embodiment gives highest landmark value to the opening and closing strings. If only these strings are shown, the tokenized form is something similar to "When in the Course . . . separation."

Capitalization is a strong indicator of landmark value (except for example in North American newspaper headlines, which use it on most words: our preferred embodiment takes such devaluation into account). It is usually associated either with proper nouns, very indicative of the topic, or a form of emphasis, Allowing small link words to appear easily, if the difference from the space needed by an ellipsis is small, the result of including words with such value is longer but more evocative of the original sentence: "When in the Course . . . Laws of Nature and of Nature's God . . . separation."

If natural language processing is available, and capable of identifying the subject and principal verb of this sentence, we may give these successively the next highest landmark values. As the landmark value display threshold descends past these, we see the forms "When in the Course . . . Laws of Nature and of Nature's God . . . a decent respect . . . separation." containing part of the subject, and "When in the Course . . . Laws of Nature and of Nature's God . . . decent respect to the opinions of mankind requires . . . separation."

Giving the next range of landmark value to the subjects and verbs of subordinate clauses, in hierachical order, we get "When in the Course . . . it becomes necessary . . . Laws of Nature and of Nature's God . . . decent respect to the opinions of mankind requires . . . they should declare . . . separation" followed by "When in the Course . . . it becomes necessary . . . dissolve . . . assume . . . Laws of Nature and of Nature's God . . . decent respect to the opinions of mankind requires . . . should declare . . . which impel . . . separation,"

and so on until the full sentence is reached. This syntactic path is not the only way to expand the sentence from "When in the Course . . . separation," nor even the least costly. With less computation, one can assign higher landmark values to words that are less common. But since humans have a more explicit awareness of syntax that of word statistics, this path illustrates conveniently the way that the transition between open and tokenized forms can be made as smooth as one wishes, down to the level of individual words appearing and disappearing as one moves in and out.

It will be evident to one skilled in the art that the same smoothness can be arranged in the appearance and disappearance of higher nodes. For example, a paragraph can appear with inclusion of its sentences of greater or less landmark value, while these in turn appear with more or fewer of their words: similarly for the appearance of a section node and its children.

Unlike the layout of a table of contents, a paragraph or sentence node whose parent is a high-level open node is visibly displayed (open or tokenized) together with the section headers that may be used as tokenized forms of its siblings. For example introductory text to a chapter, that is not quarantined in a section labelled 'Introduction', is assumed to have contextual scope for the entire chapter, and thus to have high landmark value for the user.

The displayed view thus depends on the display states of the nodes, which may be modified by user input, typically by (though not limited to) motions of the mouse cursor across it, and clicks of the mouse button(s). In a first schema, any tokenized node whose display the cursor moves across becomes open, with a return to tokenized (which we refer to as 'closing') when it leaves. In a second schema, the closing is prevented if the 'Alt' key is held down. In a third schema, the 'Alt' key may be replaced by some other specified key or button, and optionally another key or button may be used to force closing. In a fourth schema, motion of the mouse in one direction triggers opening, while motion in another triggers closing. (In our preferred implementation for languages written left to right, these are lateral motions to left and to right, respectively.) In a fifth schema, turning the mouse scroll wheel in one direction causes a node to open, turning it in the other closes it. In a sixth schema, clickable 'grow' or 'shrink' buttons are attached to the displayed forms of tokenized and open nodes respectively. In a seventh schema, clicking may be combined with the effects of moving into, over or out of a node's display region. An eighth schema uses scroll bars or sliders to control the level of detail at a chosen point. In a ninth schema, the cursor may be moved by key presses, combining with any of the first seven schemata for the effects of its motion and other key presses. In a tenth schema, the cursor may be moved by a detector of brain waves or any other input device, combining with any of the first seven schemata for the effects of its motion and other key presses. In an eleventh schema, the mouse may report left and right turning motion, which are used like the left and right lateral motion in the fourth schema. A twelfth schema gives higher display priority to a site where the user is detected as paying attention. The detection may be by means of machine observation of eye movement concentrating on that site, by a finger touching a touch screen there, by a light pen, laser pointer or other device directly indicating a position on the display, by the lingering of the cursor there, or by other means.

Many other such schemata will be evident to one skilled in the art, within the spirit of the present invention. Some user gestures may be quantified beyond 'click' versus 'no-click', such as in the speed of motion, scroll wheel turning, slider motion or mouse rotation. Such numbers may map into the rate at which the smooth transitions described above are to occur.

When a plurality of nodes has been selected, the effect on each of the selected modes when the user performs a gesture as above may be the same as its effect (according to the schema currently in effect) on a single node when no plurality is currently selected. Global growth and expansion may also be managed by a separate slider or other 1D widget whose default action is on the entire document.

A particular class of embodiments of the schemata above that respond to cursor motion into, out of, or across a node's display region, exploit the rollover methods well known in web page design. The jooming program performs the analysis into nodes and creates their open and tokenized display versions, then constructs the necessary insertions in DHTML and in JavaScript, Microsoft .Net, Flash, or the like framework, so that the schema's responses can occur in a browser that does not itself support jooming analysis of the text but does support (or has a plug-in for) the programmed responses to particular user actions that the remotely planned jooming behavior requires.

In a further use of the invention, the result of a search is displayed by a joomed view which makes visible each leaf node containing a hit or hits, on one or more search terms, displaying a wider context than by giving a few surrounding words.

In a further use of the invention, a document may be opened with only the root node in the open display state (showing its direct children by tokenized views), or with all nodes to a certain depth open, or with all nodes open to the maximum depth at which the display can fit into the available space with the current font settings, etc., or with a search view as just described.

A further use of the invention assists the user performing a non-local editing operation such as cut and paste, or modifying the content of one section in the light of what is written in another. A joomed view makes both contexts visible while showing the document structure about them.

In yet a further use of the invention, a web server or a portal quickly delivers a low-depth or search-result joomed view, so that the user has a rapid initial overview of the document's content. The content associated with deeper nodes is delivered in background, for later availability, or upon user request.

In again a further aspect of the invention, the creator or manager of a document reachable on the Web may include preferred tokenized versions of some or all nodes, which the jooming code in a portal or viewer may use in preference to its internally generated versions.

In joomed viewing of hypertext, in place of opening a link in a separate display space, or replacing the current display, a joomed view of a clicked-on link may be shown within the current view, as though it were simply another node at the same depth as the link. The node thus grafted to the display may be either the root node of the link's target document, or the deepest node containing a target anchor specified in the link. The grafted view may be either the default view with the grafted node open and its direct children tokenized, or a search view as described above, or another joomed view specified by code embedded in the hyperlink.

We summarize the flow of the method in Drawing 18. A currently loaded document is parsed 1800 as a hierarchy of nested parts, optionally represented by a 'tree' data structure. Display states are defined 1810 for each node of the hierarchy, according to default instructions or to prior input as the document was loaded, and 1820 the document is displayed accordingly. User input 1830 is accepted, processed and used 1810 to redefine the display states. This cycle may continue until the document is closed, in alternation or combination with other events such as change of graphical display scale or window size, scrolling, deletion, and search, or any other procedure for manipulation of a document or of the display of it.

BRIEF DESCRIPTION OF THE DRAWINGS

Drawing 1: A spatially zoomed view of a document, in which layout but not content are visible.

Drawing 2: A document too large for readability as a whole in many computer displays.

Figure 1:
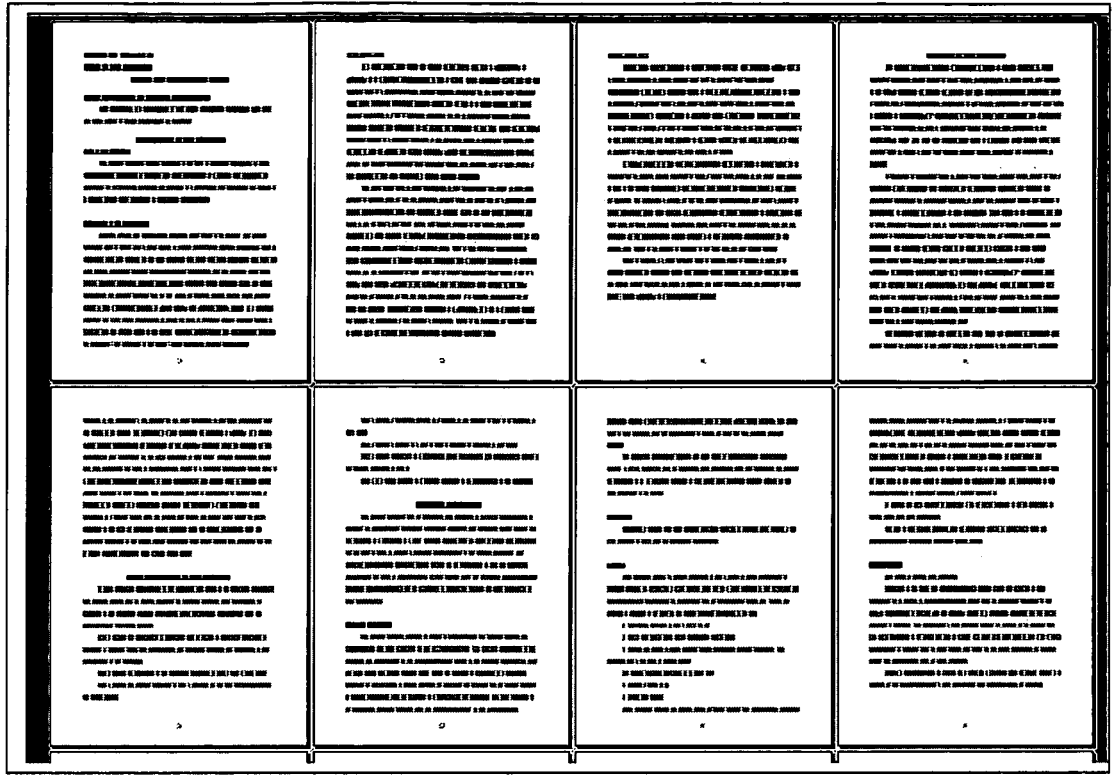
Figure 7:
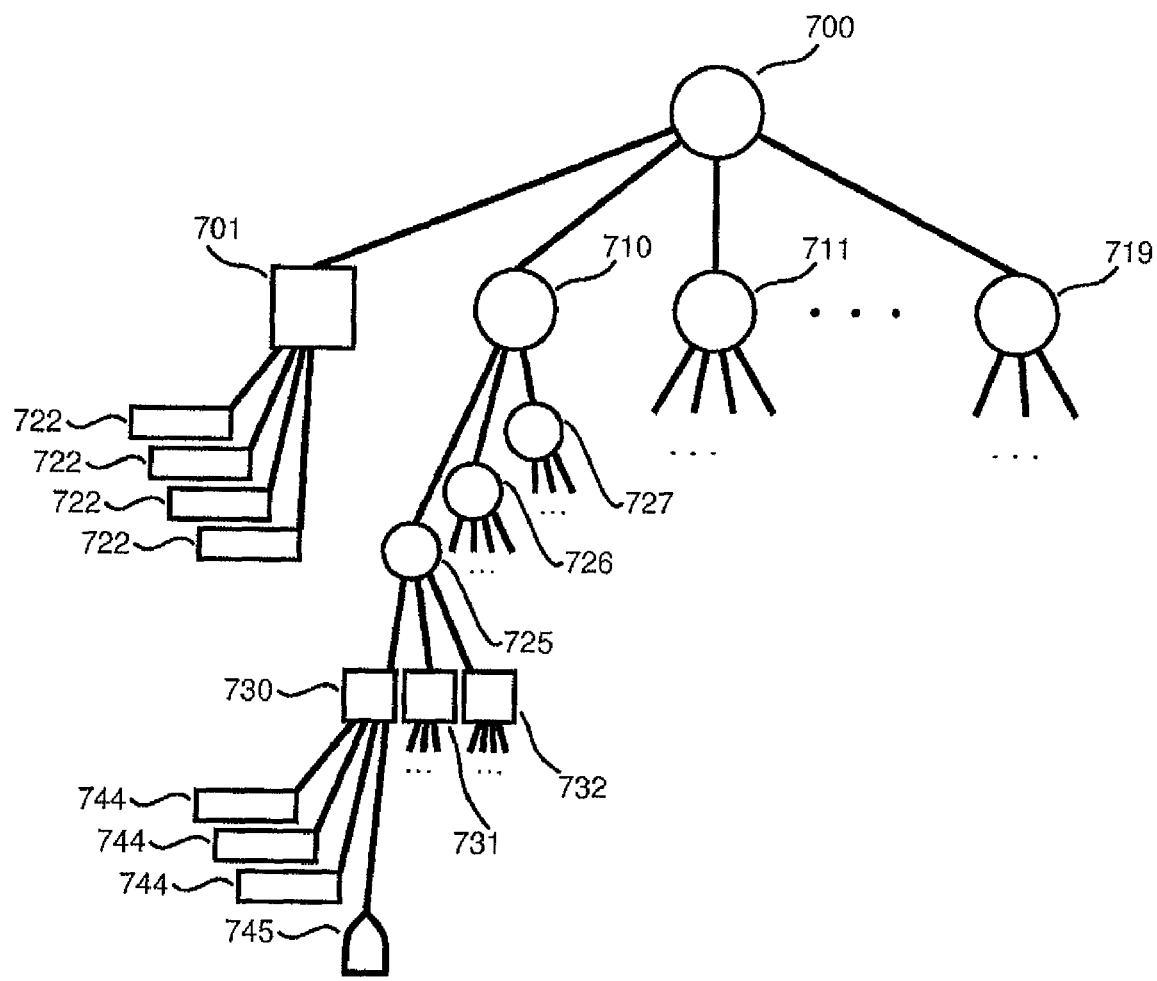
Figure 8:
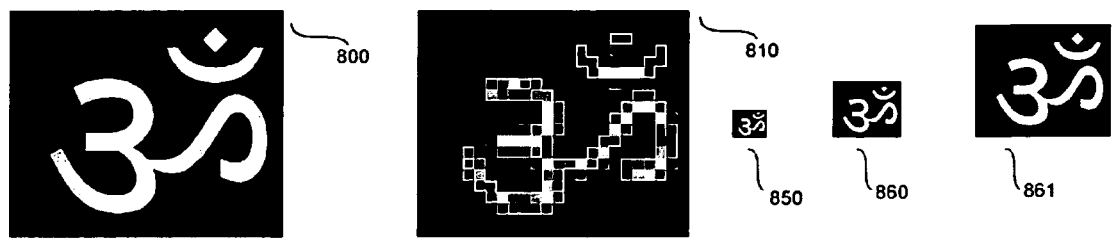
Figure 9:
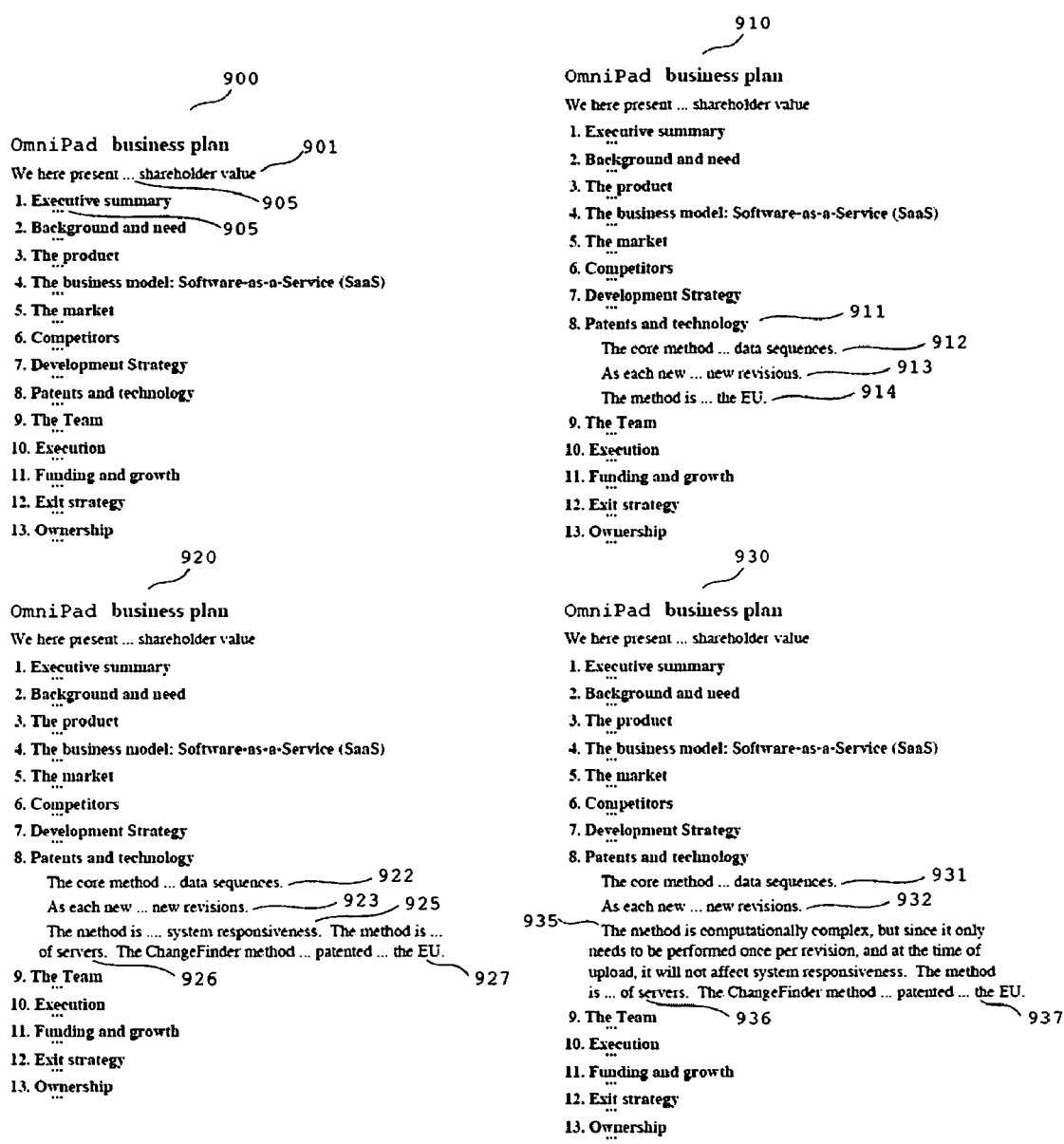
Figure 11:
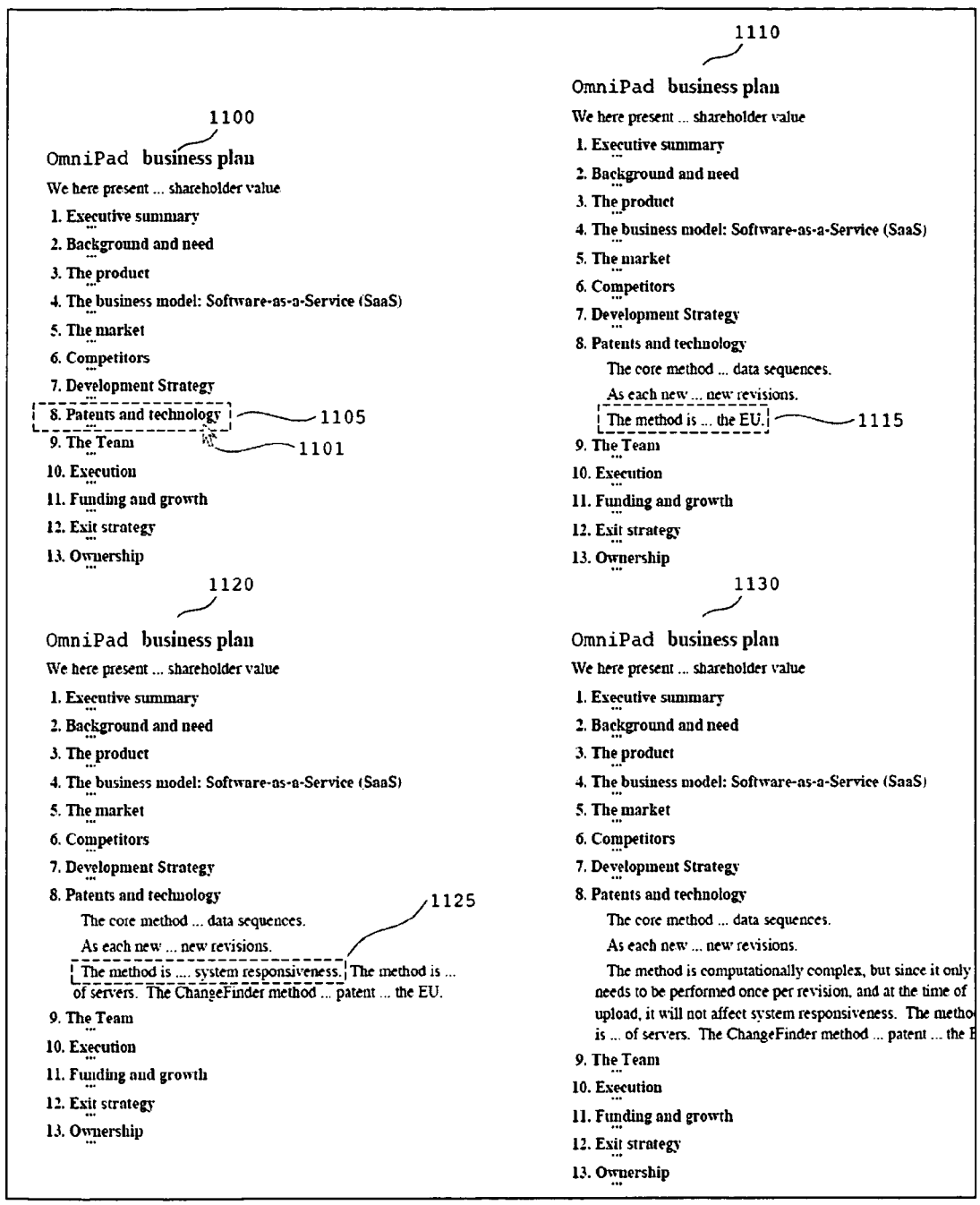
Figure 12:
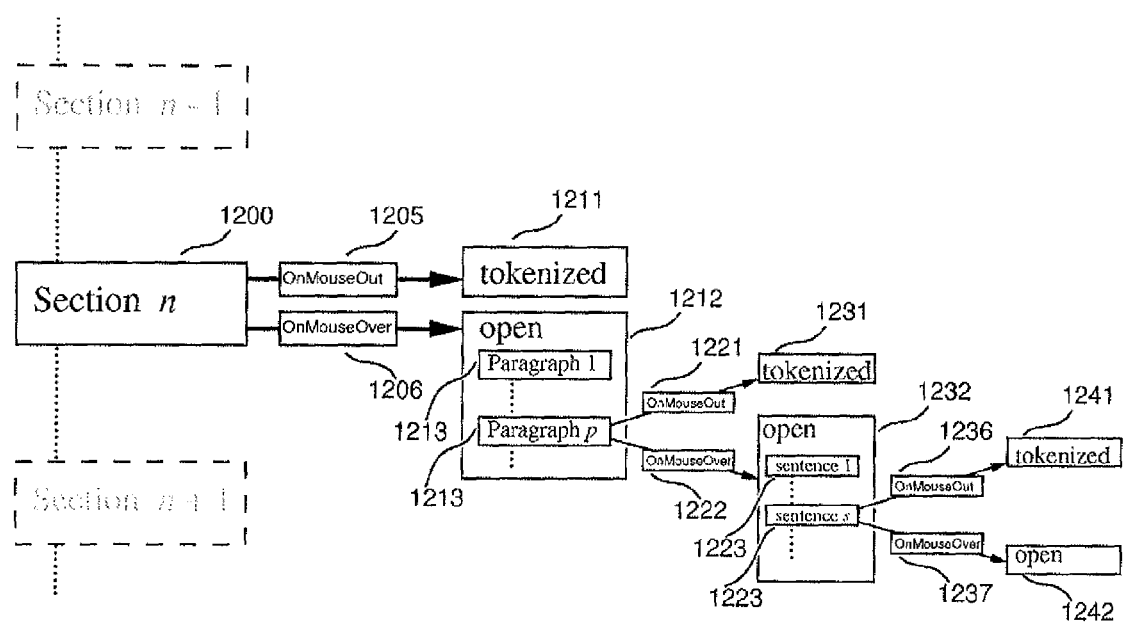
Figure 13:
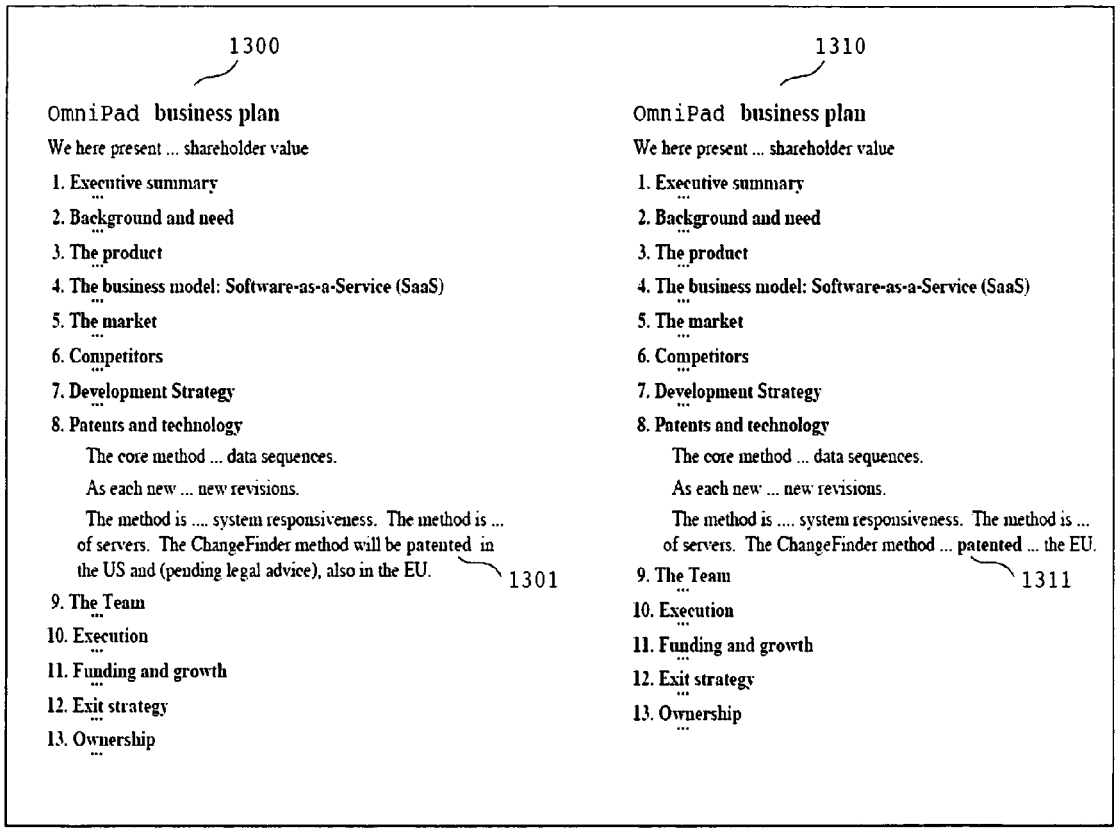
Figure 14:
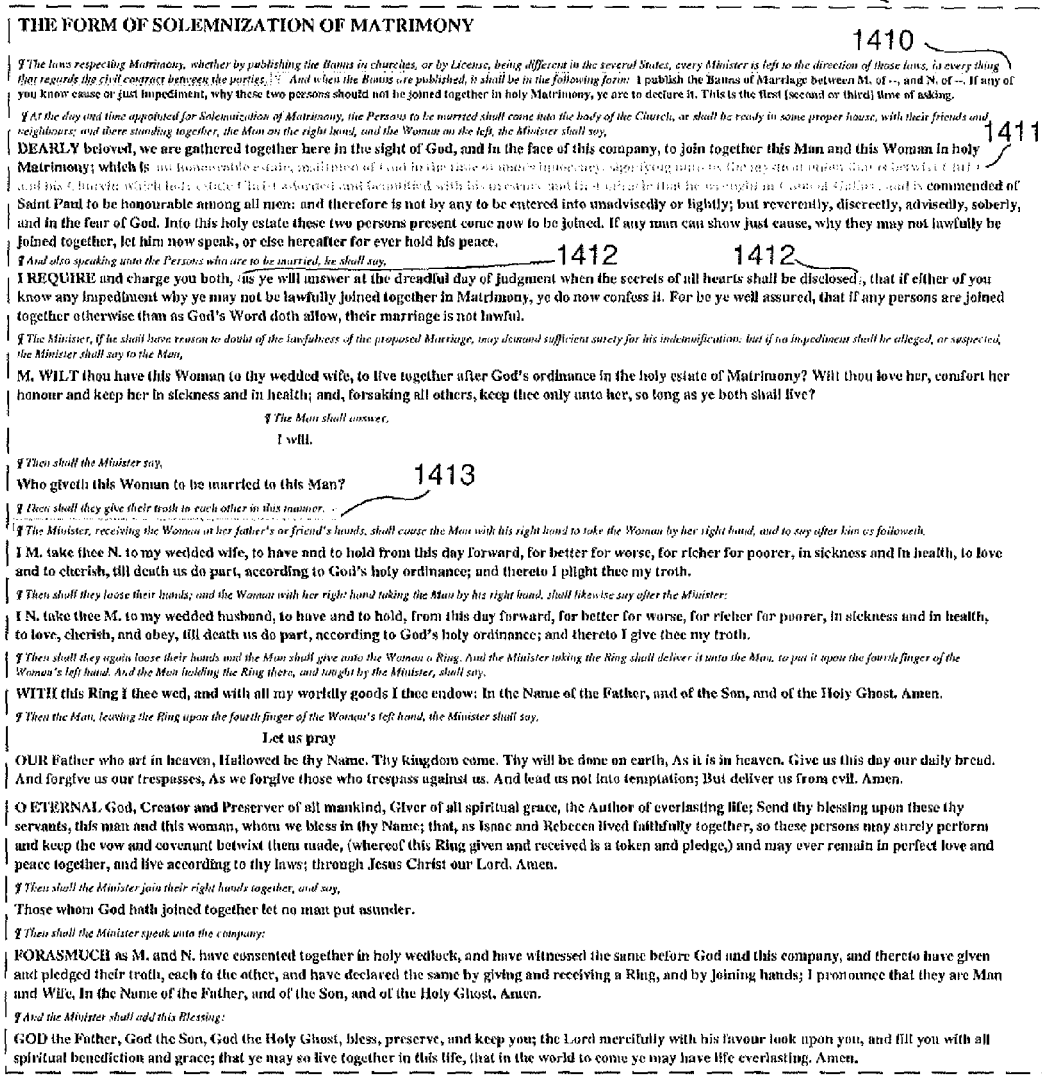

Drawing 3: The document in Drawing 2, with sentences compressed but recognizable.

Drawing 4: The document in Drawing 2, with paragraphs compressed but recognizable.

Drawing 5: The same document with a selected paragraph expanded from Drawing 4.

Drawing 6: The same document with a selected region expanded from Drawing 4.

Drawing 7: A tree representation of a document, with sections, paragraphs, sentences, etc.

Drawing 8: An image, a blown-up view of its tokenized form, and intermediate tokenizations.

Drawing 9: Different views of a Business Plan's content, with one section variously unfurled.

Drawing 10: The Business Plan illustrated in Drawing 4, with the same section fully unfurled.

Drawing 11: A 'rollover' interface for level-of-detail display control.

Drawing 12: The decision logic for a 'rollover' interface.

Drawing 13: An example result of search-guided level-of-detail display

Drawing 14: A document shown in full, with changes marked.

Drawing 15: The document of Drawing 14, with greater compression away from the changes.

Drawing 16: A document opened at a uniform depth of 2.

Drawing 17: A document opened with a bias toward sentences of low depth.

Drawing 18: An overview flow chart for the steps of the invention.

DETAILED DESCRIPTION OF THE INVENTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The disclosed variable level of detail in a user's view of a document resembles photographic 'zooming' in or out, but is different in several ways. A flower in a shrinking image may dwindle to a point of colour before vanishing: in the present invention, unlike Drawing 1, a word remains its readable self (or a readable contraction of it) as long as it is displayed at all. Moreover, though various 'lens' systems allow image magnification to vary from place to place, the nature of a 2D surface imposes great distortion in between places differently magnified. Uniform zooming thus remains much more heavily used. To distinguish the invention's content-orientation and non-distorting non-uniformity, then, we take the word in the form natural to speakers of many South and East Asian languages, and refer to jooming.

We describe first the logical representation of a document, then the nature of a joomed view, followed by the user manipulations that can control it.

Hierarchical structure A text is seen as a hierarchy of units. Most characters belong to words (including expressions like $1,283.25 or 32 ft/sec$^2$), or are punctuation makers. These belong to sentences, which belong to paragraphs, which belong to sections at various levels.

The standard conventions of European-language text permit automatic segmentation into sentences. A sentence break is defined by a "." followed by whitespace followed by—if anything—a capital letter. For this purpose a closing parenthesis or quotation mark must be allowed as the beginning of whitespace, and an opening one as the end of it. With the occurrence of a mathematical symbol at the beginning of a sentence, or of a trade name like "eBay", an algorithm would require more linguistic sophistication to recognise the same sentences that a human does, but jooming can function without this exact agreement. (Linguistic tools that would always correctly identify sentences would also be capable of identifying clauses and other such substructures, leading to variations on the present invention that will be clear to those skilled in the art.) Whitespace and punctuation were rare in Roman writing, and in Asian scripts until more recently, but have now spread to most languages. Many still eschew capitalisation, but most have introduced reliable identifiers for sentence breaks. (In some cases, such as Korean writing, this has also meant invasion by the separate sentence concept itself, changing accepted prose style.) We thus assume that a usually-correct automatic segmentation into sentences is performed by a function within any application that performs jooming.

Ancient Greek manuscripts separated units of text by a level line called a paragraphos ("with/beyond the writing [graphos]"), which gives us the next size unit. This too has invaded many languages. Visual conventions to mark it usually include a new line, often an indent or an outdent, and sometimes extra vertical space. Every digital text file format includes a paragraph-break convention: for example, $L_AT_EX$ marks them by two successive 'new line' characters in the source file (treating single ones as whitespace); MSWord uses a single one, with visible line breaks created dynamically; HTML uses "<p>" to begin a paragraph, and optionally "</p>" to end one. The use of such conventions must be implemented format by format, but the net result is a well defined separation into paragraphs. A paragraph break invariably implies a sentence break.

Above this level, the only clear consensus is that the logical hierarchy should have a strict tree structure, with no multiple descent. A sentence cannot lie across a paragraph break, a paragraph cannot continue into a new section, a section is within one chapter, which lies in one book, and so on. The actual hierarchy varies between formats, for instance in the depth of section/subsection/subsubsection/ . . . allowed.

An implemented representation need not have an explicit tree data structure. Many text formats simply mark a part's beginning, by notations like \section{Background of the Invention} in $L_AT_EX$, or in HTML <H2>Background of the Invention</H2>. An application then interprets a new marker at that level, like \section {Brief summary of the Invention} or <H2>Brief summary of the Invention</H2> as the end of the part (in the example, Background): \subsection{Structural navigation} lies within it, as in HTML does <H3>Structural navigation</H3>. These are implied relations, without for example an explicit pointer to the 'parent' of a part in the tree. In the account below we refer to an explicit tree structure, and our preferred embodiment of the invention uses a tree as an aspect of its data organisation, but it will be clear to one skilled in the art that the level-dependent display here disclosed could be implemented with other choices of data structure.

As noted in the Background, many electronic documents display recognizable sections and headers to the human user, but lack the markers just discussed, or the invisible section markers (what you don't see is what you get) in formats such as ".doc" or ".pdf". The preferred embodiment of the present invention is not restricted to documents whose creators have followed a poorly enforced set of standards, so it includes the capability to recognize section markers by the typographic indicators used by humans. These may be specified by markup in the file, such as the HTML tag <big> . . . </big>, or discovered by an optical character recognition (OCR) module that not only identifies particular printed shapes as specific upper or lower case letters from an alphabet ( ), but by means known to those skilled in the art determines the letters' color, font, font size, whether they are standard, bold, or italic, and whether they are underlined. (Since the magnification of a scanned document may not be known, the font size must be found relative to the document average, which is sufficient for present purposes. We note also that it is here enough to identify bold face or italic or underlined words, rather than individual characters. Statistical measures can straightforwardly determine whether a word has a different level of black pixels from what is typical for that string of characters in the document, whether it has a slope to the right, and whether the full word is underlined. Correct identification of a specific font from a small sample is more problematic, but where a sample of several letters consistently have shape parameters that lie outside a cluster established for each character as its document average, a temporary change of font can be asserted with high confidence.) Similarly, a line break may be identified as intentional either by the inclusion of a tag such as the HTML <br>, or by the actual ending of a line to the left of the right margin. (Where text is not right justified, an algorithm must identify the right margin boundary as the rightmost observed line end in the current region of the document. If there is a normally laid out next line, a particular line break is probably intentional if the first word of that next line of a word could have been fitted into the current line. Likewise, if the current line in right justified type has white space with no statistical evidence of stretching to reach the margin, even an ending very close to the margin may be intentional. Such tests may be multiplied by one skilled in the art, allowing an overall heuristic recognition of deliberate line breaks with a high degree of confidence.) A substring of the file that humans would recognise as a heading usually has at least one of the following characteristics.

(a) It begins at the start of a line.
(b) It occupies less than one line.
(c) It ends with an intentional line break.
(d) It is vertically more than the standard 'line skip' spacing from the previous line.
(e) It is vertically more than the standard 'line skip' spacing from the next line, but less than the distance from the previous line.
(f) It does not end with a line break, but is followed by an atypically wide space.
(g) It is in a larger font than the surrounding text.
(h) Syntactic analysis identifies it as a 'sentence fragment'.
(i) It has bold face not shared by the surrounding text.
(j) It has italicization not shared by the surrounding text.
(k) It has underlining not shared by the surrounding text.
(l) It has a color not shared by the surrounding text.
(m) It has a font not shared by the surrounding text.
(n) It has capitalization not shared by the surrounding text.

This list may be enlarged by one skilled in the art, within the spirit of the present invention. Few headings have all these features (for example, the above sub-section title "Hierarchical structure" in the present document is distinguished by (f) and (i), but not (c)), but presence of several of them makes it highly likely that a string is a header. In a particular corpus of documents, comparison of their frequencies singly and together in human-recognized headers and non-header substrings can train a statistical or neural predictor or other such instrument familiar in the art to a high recognition rate with few false positives. Characteristics (d) to (g) permit quantitative ranking, so that one string may be labelled as "if a title, of broader scope" than another, in a multiple range. Characteristics (i) to (n) are yes/no features, but a "yes" in one such characteristic makes a string likely to be of wider scope than another string with otherwise similar evaluation by these criteria, but a "no" in this characteristic. There can be no formal guarantee that a single consistent overall ranking will be consistent with all of these criteria (if an author makes one title bold, another big, which one is intended to have wider scope?), but this will frequently be the case. Where it is not, heuristics can define a ranking which minimizes total mismatch between its rank comparisons and these criteria, by weights assigned through testing on a suitable corpus of documents.

On first input of a file of more than a single page, a preferred embodiment of the present method thus first tests if for the presence of standard section or header indicators. If these are absent, it applies a statistical recogniser to create and rank an internal list of section headers, with the identified strings stored as titles. The section associated with a particular header is then defined as the body of text and other material between that header and the next header of the same rank. If section or header indicators are present, the embodiment uses them according to the conventions defines as standard for the particular file format.

In general, where an embodiment defines data constructed from but not immediately readable in a particular file, such as but not limited to the section recognition discussed above or the tree structure discussed below, it may store such data either within a newly saved form of the file, or in a companion file associated with it by use of an appropriate database or other convenient means. Upon later access of the file the constructed data can then be used without repeating the computation.

Our preferred embodiment of the present invention represents the text in explicit form as a rooted, ordered tree. We describe an exemplary version of such a tree, which as will be evident to one skilled in the art could be varied in numerous ways within the spirit of the invention. If a node A is (in the tree structure) the direct parent of a node B, we refer to B as a child of A. The children of a node are in its posterity, as are the children of the said children, and so on recursively. The parent of a node is in its ancestry, as is the parent of the said parent, and so on recursively. For descriptive purposes we subsume such terms as volume, book and chapter under the general term section, distinguished by the fact that it may have a title attached to it in the form of a string of characters, perhaps empty. Where a document is known to follow a specific set of special requirements, such as the IEEE conference format http://www.ieee.org/portal/site/mainsite/menuitem.818c0c39e85ef176fb2275875bac26c8/index.jsp?&pName=corp_level1&path=pubs/transactions&file=stylesheets.xml&xsl=generic.xsl, or has additional structure specified in a 'cascading style sheet' or other reachable source, it can be useful to take advantage of the additional knowledge of the document's organisation: for instance, a joomed display can treat an Abstract differently from how it treats a general paragraph. Such specialisation will be different in detail for each category of document, but the manner of carrying it out within the spirit of the present invention will be evident to persons skilled in the art.

In the case of Drawing 7, the root node 700 represents the document as a whole at depth 0. The paragraph 701, and the (arbitrarily many) sections 710 to 719 are at level 1, because the root 700 is their direct parent. In this example the paragraph 701 is parent to four sentences 722, which in turn may in some implementations be parents to words (not shown). Sentences 722 are at depth 2, as are the sections 725, 726 and 727. Section 725 is parent to three paragraphs 730, 731 and 732, thus at depth 3. Paragraph 730 is parent to three sentences 744, at depth 4. Our preferred embodiment also allows a non-textual node such as 745, which may be an image, a video clip, a sound file, an applet, or other item that can be presented in a browser. (The present document consistently uses 'browser' to mean 'web browser'—an application able to process any HTML file whose location is specified by a URL, and display the contents in conformity with the embedded tags.) It also permits a list node (not shown), which may be child to a section or to a paragraph, and whose children are item nodes, which may in display be numbered or bulleted. Many formats provide for a list item to have a title, so this is supported in our preferred embodiment. Otherwise an item node is like a paragraph, whose children are one or more sentences, containing words. (Lists are sometimes lists of single words, which would in this formalism be attached to their item nodes via one-word-sentence nodes. An alternative implementation could let an item node contain a word directly. Many such variations in the formalism will be evident to one skilled in the art.)

A slightly more extended tree structure considers a section as separate from its content, which is its single child. The tokenized form of the section as such is then its title, and optionally an ellipsis if no child is shown. The tokenized form of its content, where this consists directly of paragraphs with no intervening section node, then suppresses paragraph breaks. If the content includes subsections, its tokenized form lists the tokenized forms of them, or of those with sufficiently high landmark value to be included under current display criteria. This is the scheme under which Drawing 16 corresponds to a display of uniform depth.

Many other such variations of possible tree structure for a document will be evident to one skilled in the art, within the spirit of the present invention.

The children of each node have a specific order (controlling or derived from the order of the corresponding stretches of text). This may be implemented by providing the node with an array of pointers to children, or with a linked list, or with such another data structure as is judged convenient by one skilled in the art. Variations within the spirit of the invention, such as the HTML limitation to six depths of marked section, or whether a sentence or non-textual node may be a direct child of a section without an intervening paragraph, will be evident to persons skilled in the art. Every node specifies an interval in the document, either directly (such as where a word or a sentence is considered as a string of characters) or via the nodes in its posterity. (A paragraph, for instance, specifies the words in the sentences it is parent to. A section specifies words via paragraphs and perhaps intermediate sections.)

In our preferred embodiment no tree diagram as such is shown to the user: the tree structure here allows description of the method, and optionally may be used in structuring code that implements the method, but we prefer to present the user with a minimum of visible apparatus. However, a tree display may be used within the spirit of the present invention.

An extended embodiment of the present invention may include NLP functionality that can parse each sentence into its own sub-tree, with nodes of type 'noun phrase', etc., by means well known to those skilled in that art. In such a case the words of the sentence occur as the leaf nodes of the tree, that is, those which are not parents. Our initial preferred embodiment includes only sentences as textual leaf nodes. (Even a one-sentence paragraph has that sentence as child.) If included in the embodiment, a non-textual node 745, such as an image, video clip, sound file or applet, must be a leaf node. It may (like a sentence) be a child of a paragraph; some embodiments may allow it to be a direct child of a section.

Level of detail A simple zooming system would allow the user to request (through a slider or other interface method) "show the material corresponding to nodes at depths 0 to N," with control of N. Jooming includes but goes substantially beyond this. Each node can have one of three display states: we describe their effects first, before discussing means of modifying them. The node may be invisible, tokenized, or open. An invisible node is not displayed. An open leaf node is shown without abbreviation: an open parental node is displayed by showing its title (if any) and the open or tokenized view(s) of its child(ren). The invisible state is illicit for any direct child of an open node, but is required for every direct child of a tokenized or invisible node. A tokenized node is shown in a compressed manner, optimised for recognizability rather than aiming at free-standing comprehensibility of the content. Within the tokenized display, what is shown by our preferred embodiment prioritizes content with higher landmark value: if the display algorithm assigns more space to the node, the displayed form is free to include material of lower landmark value. With this embodiment a request "show the material corresponding to nodes at depths 0 to 3½", for example, is meaningful: it instructs the system to show all nodes at depths 0, 1 and 2, and tokenized forms of the nodes at depth 3 that include elements with landmark value midway (suitably interpreted, in various ways that will be clear to those skilled in the art) between a minimally tokenized version and display of a tokenized view of all its elements.

A preferred embodiment of the present invention assigns to each word in a sentence, and to each node in a hierarchy, a landmark value computed by such criteria as, but not limited to, position in the text, capitalization, italicization, bold face or change of font. A sentence has a landmark value computed from, and increasing with, the landmark values of its words, by means such as but not limited to summation, finding their mean or median, or other methods evident to one skilled in the art, optionally in combination with criteria at the sentence level whereby a sentence has higher landmark value if it is nearer a paragraph break, or if it is brief. Similar criteria define the landmark value of a higher node.

The manner of tokenization varies with the node type, but for every textual node our preferred embodiment includes a standard symbol (our current choice being the ellipsis " . . . ") that assists the user in recognising it as tokenized:

A section node may have a title, which is then the text of the node's tokenized form. (If the title is long, it may be shortened by the methods discussed below for sentences.) In this case it is followed by the tokenization symbol " . . . ", on the same line or immediately below. If it has no title, it is tokenized by using the first few words of the text it specifies, the symbol " . . . ", optionally the last few words of the text it specifies, which is normally assigned the next highest landmark value is the embodiment It may be identified as a section by the use of bold face or enlargement or underlining of the text, or such other typographic means as will be evident to one skilled in the art.

A paragraph node does not have a title (though it may be the sole child of a section that does). Our current preferred implementation tokenizes it like a title-less section node, eschewing typographical variation that does not come from the source text. The tokenized form may include words from the start and end of the paragraph. Words or short phrases of high landmark value, with priority in forming tokenized forms. Optionally, landmark value is computed for each word, and a tokenized form chosen that maximizes total landmark value of displayed words, subject to the allocated space. Omitted word strings are represented by ellipses " . . . " or other recognizable omission sign. Sub-sentence nodes that are included may themselves be displayed in tokenized form, if available.

Elements of higher landmark value include hypertext links, since they often represent key structural elements of the information conveyed by the paragraph. An embodiment may include routines tot raise the landmark value assigned to uncommon words, or semantically important terms such as proper nouns. A word un-listed in a standard dictionary digitally embedded in or available to the embodiment is either rare or specific to the document's context, such as a trade name or innovative terminology. It has a landmark value which is an increasing function of the distance within the document to the previous occurrence of the same term in the text. Features (i) to (n) listed above are typographical indicators of landmark value for a word or short sequence of words. If the document contains a list of key words, our preferred embodiment identifies this list and gives these words high landmark value. If the document contains 'jooming mark-up' as discussed below, this may include a separate list of terms to be given specific values. Preferably the tokenized form of a paragraph fits within a single line of text display, and is alone on that line. Many variations on these ways to select words to include in a tokenized form will be evident to one skilled in the art, within the spirit of the present invention.

A sentence node is tokenized like a paragraph node, including the last and first few words, and optionally high landmark value words or phrases within the sentence, with a decreasing landmark value threshold if more space is permitted to the sentence in the display. Start and end words receive a high positional landmark value (decreasing with distance from the sentence extremity), which may also be raised by the reasons for landmark value discussed above. Opening and closing strings of words may thus be longer if they include words that have high landmark value for non-positional reasons. Proximity to a colon ":" raises the landmark value of a word, by less than the same proximity to a sentence break but by more than proximity to a semi-colon ";".

A sentence node does not require a separate line for display.

A list node is tokenized by showing the tokenized forms of the first and last items (if these are distinct), with an ellipsis " . . . " between them.

An item node is tokenized by its title, if present: otherwise, like a paragraph node.

If NLP is used to parse sentences, sub-sentence nodes may be tokenized in various ways. Clusters like "Patent Cooperation Treaty" often have standard abbreviations like "PCT", which can replace them in display. To show that they are tokenized (and so expandable), an ellipsis may be introduced, in the form "PC . . . T", or a convention used that periods (as in "P.C.T." or "U.S.A.") signify tokenization, whereas period-free acronyms ("PCT" or "USA") are thus in the full text. This abbreviation style cannot be based on a simple rule of using word initials, which would represent "desoxyribonucleic acid" as "DA" not "DNA", or use segment initials like "DORNA". A look-up table in this direction has an unambiguous result. (Contextual reasoning is needed in expanding "HGV" to "hepatitis G virus" versus "heavy goods vehicle" or "Handels-und Gewerbeverein", but not in contraction.) A long word such as "sodiummetadiaminoparadioxyarsenobenzoemethylenesulphoxylate" may have a standard acronym ("SODL" can also mean "Simple Object Definition Language") in an available table, or may be tokenized by ellipsis ("sodium . . . late") for jooming purposes. If a node has several abbreviations of different length, a lower landmark value threshold permits the display of a longer abbreviation. Many tokenization means will be evident to those skilled in the art, within the spirit of the present invention.

It is standard web technology to download an image in increasing detail, so that the first appearance of the image 800 in Drawing 8 resembles the form 810 (depending on the specific encoding). It has data enough to represent intensities directly at only a few pixels, but for stability of web page layout is usually shown at the un-reduced size. The focus of the present invention being on presenting structure in a minimum of space, our preferred embodiment tokenizes the corresponding image node as the 'thumbnail' 850. In this illustration, the image 850 is ⅛ the length and height of the original. An alternative embodiment may include a node with such a thumbnail 850 as its tokenized form, a node tokenized by a less compressed view 860 as its child, a yet less compressed view 861 as the child of 860, and so on to the original image as deepest version: specifying the depth determines which is shown. (A näve implementation, treating these images as separate, requires additional space and download time. A sequence half the length and height, then half again, and so on down to the thumbnail, needs about ⅘ of the full image's resources. Many compression methods, however, avoid such redundancy, while allowing the smallest image—typically to be displayed first, and perhaps never enlarged—to download first. Successive finer images incorporate the data of the coarser ones, rather than repeat it.)

A sound node may be tokenized by an icon which when activated causes the playing of the opening second(s) of the sound file, optionally at lower fidelity (with a consequent saving in memory and bandwidth). If jooming becomes a widely used technology, standards can be agreed by which a sound file can be accompanied by tokenization specified by the creator, rather than extracted ad hoc by the jooming embodiment.

An animation or video node may be tokenized via a still, such as the opening image or a representative one, which in turn is tokenized as discussed above for images. If jooming becomes a widely used technology, standards can be agreed by which a sound file can be accompanied by tokenization specified by the creator.

A Java applet is sited on a web page by HTML code such as <applet CODE="FuBar.class" WIDTH=600 HEIGHT=122></applet>. To shrink its display is complex, as it may contain a variety of coordinate systems, explicit image sizes, etc.: our preferred initial embodiment tokenizes an applet node by a simple text item such as " appletFuBar ".

If jooming becomes a widely used technology, standards can be agreed by which an applet is to be accompanied by tokenization specified by the creator.

The current display states may be encoded in different ways, within the spirit of the invention. If an explicit tree data structure is used, in object-oriented code, it is natural that each node should have its display state as a member field. If the text is manipulated as a marked but unstructured string, then by analogy with the <b> or <i> marker in HTML that respectively initiates a bold or italic state, which persists until cancelled by a </b> or </i>, a marker [i], [t] or [o] could indicate respectively that the following text is invisible, tokenized or open until the next [i], [t] or [o] occurs. If the embodiment uses landmark values, a marker [ll3.5] could indicate an exemplary landmark value of 3.5 that persists until (for example) [ll2.7] changes the subsequent matter to level 2.7. Still other ways of encoding the display state will be evident to one skilled in the art, within the spirit of the invention.

Drawings 9 and 10 illustrate results of different assignments of display states, for a typically organised Business Plan. In the view 900, the root node 700 introduced in Drawing 7 has display state open, making all its section children visible. Since these have the display state tokenized, they are shown as titles, each with an ellipsis " . . . " 905 to show its state. Most of them are section nodes, tokenized using their titles, but the first 901 is the tokenized form of a paragraph which occurs as a direct child of the root node: any ellipsis 905 can be expanded—within the joomed display of the document—to a more extensive view, whether of a section, a paragraph, or a sentence. A separated TOC display such as discussed in the Background to the Invention would not show the non-header material 901, but the view 900 is not a view of a TOC. It is an expandable view of the document itself. At high compression levels it can resemble a TOC, particularly if an author has been intimidated into putting all text at a uniform section depth (for the convenience of word-processing programmers rather than that of authors or readers). Where the headers have been identified by the heuristics discussed above, rather than labelled according to a file format standard for marking sections, it provides a view that is useful to an author as well as to a reader, since a 'by hand' section labelling can easily contain inconsistencies which are easily missed as the author scrolls through the document, and could later confuse a reader using the titles to form a grasp of the document's organization. The means of incorporating this view into editing tools will be evident to one skilled in the art. Alternatively, an author may use any embodiment of the present invention, including but not limited to the 'portal' embodiment discussed below, to view a file edited within work processing software independent of the present invention, to see the joomed view. This has both a utility similar to that of viewing an HTML page in a number of different browsers, to see how it will look to a reader, and the utility of making heading inconsistencies easily visible to the author. It is material to the invention that the header recognition routines should function well, but also that it should not succeed in reading the author's mind as to sectional groupings where these groupings have been inconsistently indicated. Showing the groupings heuristically extractable from the file, where these are not consistent with the author's intentions, is a useful feedback step in enabling the author to provide labelling that will communicate more clearly to the reader what grouping is intended.

A further feature which may be provided by the present invention, of use particularly to authors, is to re-export a version of the file with sections labelled in a manner consistent with the standards of the file format. This may have unexpected consequences where the standards or the software that defines them are poorly designed. (For example, in one widely used editing program the programmed result of removing a section break is that the fonts, indenting, etc., of the material after the break invade the material before it, rather than the after-break material adopting the style beginning at the header that now applies to it.) In such an environment the side effects of a change in sectioning, even at paragraph level, are hard to predict and allow for. The author may thus need to perform additional clean-up in such a re-exported version, but may still find this functionality of the present invention to be of value.

By the above rules, all nodes other than 900 and the tokenized forms of its direct children are invisible, since they are not children of currently open nodes. In view 910, the state of the section node 911 has been changed to open, so that its paragraph children 912, 913 and 914 must either be open or (as in this case) tokenized. (As noted above, an alternate tree structure would include an additional 'content' child of 911 without paragraph breaks.) In view 920, the first two 922, 923 of these remain tokenized, but the paragraph 914 has become open, and is displayed as the three tokenized sentences 925, 926 and 927. (Note that "patented" is included in 927; it is easily recognised, even without semantic analysis, as a less frequent and thus higher-information word.) The tokenized sentence 925 is replaced in view 930 by the open sentence 935, but the tokenized sentences 926 and 927 remain as the tokenized sentences 936 and 937.

Drawing 10 shows all the text in the section 1010 as open. No one of the views in Drawing 9 is readable as a comprehensible summary of this section, but to find and re-find the content 1010 that appears fully in the view 1000 is easier by way of these other views, given an intuitive interface for navigation between them. This spectrum of single-window views of the document ranges in small steps from the top level (consisting mainly or entirely of section titles) to a fully open display of it, including all text. Between these extremes lie partially expanded views, with differing amounts of text (open and tokenized) as well as different levels of visible header, in which the document structure remains consistently in view.

Manipulating views We refer to changing a node's state from tokenized to open as 'opening' it, and the reverse as 'closing'. A node's change from invisible to tokenized is not under direct user control (the user needs some form of display to select it), but occurs automatically when its parent is opened. Many direct ways to make a tokenized node invisible could be implemented, but our preferred embodiment does not require this.

I1) A preliminary interface, requiring few clicks or other actions on the part of the user, uses the simple rule "what is rolled over, becomes visible". Each displayed token has a sensitivity region, represented here with a dashed outline (not seen by the user). In Drawing 11, a cursor 1101 touching the sensitivity area 1105 within the view 1100 causes the corresponding tokenized section to become open, giving view 1110 (equivalent to 910). A cursor touching 1115 causes the change to view 1120, where touching 1125 opens view 1130.

This rule leads to the question of what to do when the cursor leaves a node's sensitivity area. If the node reverts to tokenized status, and to invisible when its parent becomes tokenized, then at a given moment only one leaf node can ever be open: the node in whose area the cursor is at that moment. This makes the useful view 1000 in Drawing 10 unreachable. If nodes do not revert, however, the user can only increase what is visible, and cannot fold away parts of the file that are not of current interest. The following discussion includes alternative solutions to this: other sub-methods will be evident to those skilled to the art.

I2) Analogous to the de-visibilizing above, we note that clicking on a single item when making a selection in Windows™ deselects previously chosen items, unless the 'Control' key is held down, in which case a selection list grows. (Similarly in the MacOS™, using the 'Apple' key.) This makes it easy for a user to learn jooming schema by which moving the cursor with the said key pressed always increases the depth where it touches, with no when it leaves.

I3) Alternatively, the same modified effect may be assigned to holding down some other key, or to holding down the left mouse button, or to holding down the right mouse button. Another key or button may be assigned to the active closing of nodes.

I4) A further alternative schema connects to the perception that in Drawing 6 the more detailed view 'grows' from the left, toward the right. Thus, with the cursor on the display region of a particular node, to move it leftward requests it to shrink (that is, changes its display state from open to tokenized or from tokenized to invisible), while a motion to the right grows it: changes its display state from tokenized to open. (Our preferred embodiment reverses this for right-to-left scripts.) This schema takes meaning only from change in the cursor position, though absolute position within the display window determines the region and hence the node to which the meaning applies.

I5) A further alternative schema uses the scroll wheel built in to a majority of currently available computer mice. Scrolling forward may grow the node whose sensitivity region currently contains the cursor, while scrolling backward shrinks it, or vice versa.

I6) An embodiment may also derive meaning from position, by showing a 'shrink box' for every open node and a 'grow box' for every tokenized one, displayed for example to the immediate left of the displayed form. These may act when clicked on, or when merely passed over, and optionally may be connected by the lines usually drawn when displaying a tree. Such boxes require more careful targeting by the mouse user, and more cursor motion to reach them, than the schemata responding to a cursor anywhere in a node's display region. In our preferred embodiment shrinking a node makes everything invisible in its entire posterity, whatever their states, whereas growing it makes only its direct children tokenized (and hence visible). To remember the state of its posterity complicates not only the programming, but the user's sense of how the system will respond to a simple action.

I6) A further embodiment may allow the user to select a point, by some means such as but not limited to a mouse click, direction of gaze, or keyboard arrow points, and then drag a scroll or slider bar (in a fixed location or near the cursor as a 'tool tip' or 'floating palette'), causing nodes whose sensitivity area successively to grow or shrink according to the direction of drag. We follow UI design custom in referring to entities such as the above grow and shrink boxes, and the control bars just mentioned, as widgets.

I7) A further embodiment may also derive meaning from position by including in the display a responsive strip whose sections correspond systematically to nodes. As an example, but not limited to it, a vertical strip whose segments may be touched to shrink the nodes displayed exactly to the right of them, while touching a sensitivity region grows the display of the corresponding node.

I8) Optionally, the clicking form of the above rule may combine with one of the touching rules discussed previously. In this case, the 'touching' is best interpreted as the cursor entering the sensitivity area, rather than merely being present in it. It would be present after a click, and should not reverse the click's effect.

I9) The design of a keyboard-only version of the above rules, where the cursor is for example moved by pressing the arrow keys (or as in the UNIX 'vi' editor, a set such as the h, j, k, and l keys), and buttons are replaced other keys, will be evident to those skilled in the art.

I10) Similarly, brain-wave control via electrical sensors on or near the user's scalp already has conventional mappings to cursor motion control and the pressing of buttons, and such a system may be directly used for control of jooming.

I11) Using a 'mushaca' or rotation-reporting mouse (T Poston, M B Srikanth, Computer input device enabling three degrees of freedom and related input and feedback methods, pending Indian Patent Office 1928/CHE/2005), an alternative to button or key presses is possible. For example, moving the mouse with a clockwise twist may opens nodes, while moving it with a widdershins twist closes them.

I12) Other such mushaca input schemes within the spirit of the invention will be evident to those skilled in the art, as will the use of other input devices such as a joystick.

I13) The region the user is detected as paying attention to may be given higher display priority, in the form of a lower local landmark value threshold or a deeper reach into the hierarchy, and thus expand automatically at the expense of other regions, which are thus either displaced beyond the current display window or displayed in less detail. The detection may be by means of machine observation of eye movement concentrating on that region, a finger touching a touch screen there, a light pen, laser pointer or other pointing device directly indicating a position on the display, or the lingering of the cursor there. In the latter case, 'lingering' is to be interpreted as making small motions in the vicinity, since complete stillness of the mouse may as easily suggest that the user's attention has completely left the display as that it is focussed on a particular region. The size of the region of concern may be deduced statistically from the range of motion of the gaze, finger, pointing device or cursor.

Computer users are accustomed to selecting a plurality of entities, by means familiar to those skilled in the art of user interface design, such as rubberbanding a rectangular region to contain them, or clicking on one after another with the 'Control' key or some other standard key kept down. When a plurality of nodes has been selected in this manner, the effect on each of the selected modes when the user performs a gesture described above may be the same as its effect (according to the schema currently in effect) on a single node when no plurality is currently selected. This holds also for a plurality that includes all nodes, selected either by mouse interaction or by a keyboard command such as the 'Control-A' combination widely used for this purpose. Global growth and expansion may also be managed by a separate slider or other 1D widget whose default action is on the entire document.

As the above examples illustrate, a wide variety of user controls is possible for the display method here disclosed. Those skilled in the art will have no difficulty in devising many other such methods, within the spirit of the present invention.

Rollover implementation There are many ways to achieve the display behaviours disclosed above, as will be clear to those skilled in the art. Some would provide good student exercises in the use of various environments capable of displaying strings and detecting cursor location. ("Implement joomed display for a classical ASCII terminal, for Java2D, for Swing," etc.) One particular implementation is noteworthy because the display tool itself does not need to be jooming-specific. With suitable input, an HTML page can act in a browser in a manner such as those described above. The tree structure is not explicitly represented in the HTML page, though the program on the server may take a document in some standard format, construct an explicit tree, use it to create a page of DHTML (Dynamic Hypertext Mark-up Language) and JavaScript or Microsoft .NET that shows the required behaviour, and deliver it to the user's browser. We call such a program a jooming server. The logic to be embedded is illustrated, for three levels of the above preliminary interface (I1), in Drawing 12. For simplicity we describe the embodiment without display dependence on landmark values, whose manner of inclusion will be evident to one skilled in the art.

If a section 1200 containing only paragraphs is visible, it has a sensitivity region in the browser window. If 1205 the mouse cursor moves out of this region, the HTML begins to display 1211 the section's tokenized version. This version is provided by the jooming server in the form of standard HTML text, marked up as to font, color, links, and so on: the browser itself is not required to create it from the extended text. If 1206 the mouse cursor moves into the sensitivity region associated with the section 1200, the HTML begins to display 1212 the section's open version. This consists of the sequence of tokenized versions 1213 of the paragraphs within the section 1200. Since this display's sensitivity occupies a larger region than the open version's region, normally including it, the cursor is usually inside the display region of one of these tokenized versions 1213. If 1221 it moves out of this region, the HTML begins or continues to display 1231 the paragraph's tokenized version (as before, created by the jooming server and provided as HTML). If 1222 it moves into a region within the display area of a tokenized paragraph 1213, the HTML begins to display 1232 the paragraph's open version. This consists of the sequence of tokenized versions 1223 of the sentences within the paragraph 1213. When 1236 the cursor moves out of the display region of such a tokenized version 1223, the HTML begins or continues to display 1241 the sentence's tokenized version. If 1237 it moves into this display region, the HTML begins to display 1242 the sentence's open version. Similar logic may act for nodes above the level of the section 1200, or to nodes below the sentence level 1223.

Other such interfaces, as described above, can be similarly embodied in a jooming server for use in a browser. For example, as will be evident to those skilled in the art, the left and right motion required for the interaction schema (I4) above may be detected by interpreting the messages generated by use of the OnMouseMove criterion. Similarly, DHTML supports the multiple selection conventions by which the user can select a plurality of nodes, or all of them, and extend the schemata above accordingly. Flash, available as a plug-in to most browsers, enables similar results via a different kind of 'thin client', where negotiation between the server and the client is more controlled. The creation by the jooming server of display code that takes effect at the level of the user's machine, to produce fast response without web access delays, can thus be implemented in many current and future schemes of display code, within the spirit of the present invention.

By means of a jooming server, the use of a dynamically joomed display is not limited to those users who have installed tools designed specifically to support jooming methods. Search views Every document viewer or editor includes a functionality whereby the user can select or paste or type in a 'search term' (a word, a string, or a regular expression with components such as 'wild cards' which match any letter), and find occurrences of it in the document. Usually the display jumps directly to the text region where the first occurrence is found, so that the user has to read around, and sometimes scroll to reach headings, in order to know where (structurally) in the file the jump has reached. An exception is the Adobe Acrobat reader, which provides a list of hits, each with half a dozen words of context visible. More context can be seen by sideways scrolling, and rolling the cursor over a small icon reveals the page number (not the section identifier in the contents tree shown in another window, which conversely avoids page numbers).

A joomed view can show clearly not only a search hit, but its location within the document as a structured (not merely page-numbered) text. One option is to require the leaf node whose text contains the hit to be in the open display state, which requires everything in its ancestry to be open; other direct children of its ancestors are tokenized; the remaining nodes are hence invisible. Drawing 13 shows this view 1300 for a case where 'patented' achieves one hit 1301. For illustration, the drawing highlights this by bold face; our preferred implementation uses colour, blinking, or another means to distinguish highlighting from typography, as is well understood by those skilled in the art.

An alternative, if the total number of hits is small, is to make open each of the leaf nodes containing a hit, and hence all of their ancestors: all other nodes are tokenized or invisible. This both gives each hit a context, and supplies an overview of where hits are concentrated.

The view 1310 shows the hit 1311 within the display of a tokenized node, using less space. This may extend to span several depths, up to showing only that the hit is within the text specified by a depth-1 node. Such space saving is especially useful for more numerous hits.

Where the number of hits is too large to show individually, an embodiment may show a view unfolded only to a maximal extent subject to its continuing to fit in a window, in which a section containing more hits than others is unfolded more, and the number of hits is symbolized by a colored number, by a string of that many icons such as text bullets, or such other indications of score as will be evident to one skilled in the art. Where a user expands a particular section in such a maximal single-window display, forcing the top or the bottom of the file organization from the visible display, the expanded section may still be shown by such a numerical distinction among its subsections, or by displaying leaf nodes with the hits.

Most editors and readers allow search only for single strings. Most web search engines allow multiple search terms, so that for example one can seek pages containing both 'volume' and 'rendering' without their having to be joined as "volume rendering". Where hits are displayed by jumping to them, one jumps at most to a "volume" as to a "rendering". A joomed view unfolds as easily around hits on several terms as around hits on a single term. Our preferred embodiment supports this capability, and interprets "search term" in this extended sense.

Other such search view structures will be evident to one skilled in the art, within the spirit of the present invention. The choice of a particular structure may be built into an embodiment, or an embodiment may be equipped to provide several such views, with a choice determined by a user-settable default, or modified for particular cases.

Opening views When a file is opened in a typical editor or reader, the window normally shows the beginning of the file. If the text is relatively technical, there may be a Table of Contents, but often a first page is a mostly-white-space cover, and the user must scroll to the TOC. Certain structures such as 'Portable Document Format' (PDF) optionally include a digitally structured TOC, displayable in a side window as interactive navigation apparatus, but the beginning (including all its whitespace) is still the default opening display.

Where jooming is available, it creates more options. A file may open in a 'level 1 only' view $V_1$, like 900 in Drawing 9, or 'levels 1 and 2' like 1600 in Drawing 16. It may open in a uniform 'levels 1 to n' view $V_n$, where n is set by the opening command. It may open in a 'one-window overview', which is equivalent to 'view $V_n$ where n is the largest number such that $V_n$ fits into the available window at current settings for height, width and font size'. If a search term is provided, it may open with a search view for that term, following default settings for such a view, or using settings specified simultaneously with the search term.

A further opening style arises where the document is an edited version of another, and the differences are known. The mechanism as described above for a search view may be applied, save that instead of search hits the prioritized elements are differences. Drawing 14 shows the forms of marriage ceremony specified in the 1822 and 1879 Book of Common Prayer used in the United States of America, with the four differences noted: 1410 the separation of one rubric into two and the insertion of a ☐, 1411 some added text, 1412 a pair of parentheses, and 1413 the joining of two rubrics with deletion of a ☐. This view fits within a page of high-resolution printed text, but is not readable on a typical display screen. Even the print is hard for many eyes. The joomed view in Drawing 15 shows in full the changes 1510, 1511, 1512, 1513 and their immediate context, but decreases detail with distance from the changes. To a reader at all familiar with the ceremony, this display clearly locates the changes, within a single unscrolled window. To exercise an option of accepting or rejecting the changes, as a co-author, such a reader would have little need to see more (but, in a dynamically joomed view, could see more with a flick of the mouse). As the size of a document grows, the advantages of seeing at a glance where the changes are—as against scrolling through to see where they are marked, or clicking on 'next change' to land repeatedly in a new and disconnected context—grow with it.

Drawing 16 displays an overview of a document fitted into a particular display area, with node 0 as the document title. Its direct child is the content of the whole document, whose tokenized form would show the first five title-less paragraphs and the four headers 1610, 1611, 1612 and 1613. The content is shown, however, as open, so that the paragraphs appear separately in their own tokenized forms, as does the content of each of the titled sections. In the case of sections 1610, 1611 and 1613 this content appears as compressed text, whereas for section 1612 it appears as a list of three subtitles.

Alternatively, Drawing 17 in an equal display area prioritizes the words that the authors placed highest, going to level 4 if or these words but only to level 1 with the section headings 1710. Such text is often intended to be summarizing (even if not labelled as an abstract), motivational, or particularly memorable or characteristic of a document, and so may be more immediately useful to the arriving reader than is the deeper text. An opening view of this kind may be implemented by attaching to textual material an opening weight which is a decreasing function of hierarchical depth, and selecting the opening display to maximize total opening weight. An embodiment may also use opening weight as an additional temporary factor in determining landmark value, and thus use weight to influence but not wholly determine the opening display.

An embodiment may opt for the uniform style of opening display exemplified in Drawing 16, a text-depth influenced style such as exemplified in Drawing 17, or a display which maximizes a convex increasing function (such as the total) of the landmark values of the nodes displayed. Other such opening styles will be evident to those skilled in the art, within the spirit of the present invention.

Editing uses of the invention A companion application ("A Method and System for Facilitating the Production of Documents" by the same inventors) teaches certain editing methods that exploit jooming in the presence of advanced search and comparison techniques. Here, we disclose the utility of a joomed view as complementary to operations used in any current editing scheme, in editors as various as vi, emacs and MSWord.

As already noted, when an author does not cooperate with the section labelling mechanisms devised by a programmer (this occurs from ignorance of them, or well-grounded dislike) the present invention can optionally give an overview of the typographically embedded labelling pattern, by algorithmically extracting it. Using a joomable view, with an embodiment that includes this option of finding such a pattern, hence allows the author to check for coherence without scrolling through the entire uncompressed document and comparing headers with a visual memory of other headers. Our preferred embodiment of the present invention, when used in the editing context, is that jooming should be incorporated in the editor's display window. However, if the editing software in use does not support this, a jooming embodiment may automatically update its version of the file whenever the editor performs a "save", so that its display appears as a companion window with a minimum of synchronization effort by the user. Such a jooming embodiment may run on the user's machine, on a local server reachable via a local intranet, or sited anywhere and reached via the web.

Other editing uses will perform best if the joomable display is embedded in the editing application. The discussion above discloses a means of navigating a document, which may be a static text, not changed by the user's attention. (Tokenized forms, etc., are constructed for display, and need not be permanently stored to be useful.) "The Philosophers have only interpreted the world in various ways; the point, however, is to change it," and files too must be changed. Among the most common editing operations are selection of a block of text, and copying the block to scratch memory, deleting it, copying to scratch while deleting it, or directly moving it to another location. When such a block is too large to be seen as a whole in a single window, the solutions currently available are to shrink the image of the file—which quickly reaches the illegibility shown in Drawing 1—or to scroll the view, so that first one end of the desired block and then the other comes into view. This can cause delay (particularly when scrolling mechanisms overshoot) and the lack of an overview makes errors occur easily.

Similarly, when copying or moving text from one part of the file to another, the user can today begin with the copying step (including deletion, or otherwise), scroll to the other location, and paste in the copied material; or, can split the screen into parts, scroll one window to see the source region of the file and the other to see the target, and move material from one view to the other. Both give only a weak sense of where the regions are, relative to each other; the intervening material is a dry stretch to be scrolled over, and may be remembered but is not in any way displayed when the user is adding material in the target region.

These processes are simply managed in a joomed view. It is easy to arrange simultaneous visibility of the ends of a block of text to be copied or moved (particularly since a large block usually begins and ends at the boundaries of a list, paragraph or even section) with the intervening material displayed tokenized between them. It is not harder to arrange that a similarly connected single window also displays the point where the material is to be copied or inserted. The resulting visibility of the structure of the document being edited reduces the risk of 'not seeing the wood for the trees', and damaging the overall structure by local changes. The method here disclosed represents an enhancement applicable to any editing application.

Web-specific uses of the invention The above discussion applies to viewing or editing a document file however obtained, including one that exists locally on the user's computer, allowing a more convenient navigation of the document. There are further advantages to the method, when applied to a document delivered over the web.

Available bandwidth often means that a document or web page is delivered slowly. A web server that first delivers a small joomed view like 900 can deliver it far more quickly. The user examines this view, expands a section, a sub-section, and so on. This quickly reaches particular material, because the server need only keep up with the user, rather than supply the user's browser with a sea for the user to swim in. Optionally, the embodiment downloads more of the document in the background via RSS feeds (as gmail does for incoming mail data), so that if the user chooses to look inside a section, additional detail is available quickly.

Slow download is particularly frustrating to a user who (for example) knows that a search hit indicates that somewhere in the document there are mentions of 'volume' and 'rendering', giving a chance of a discussion of how display of 3D images is achieved. It can be frustrating to download the entire document, search within it, and find estimates of the volume of fat produced by rendering offal. (Such problems are diminished by the practice of displaying a snippet of context around the reported hit, but not eliminated.) If the opening download is a search view for the user's search term(s), as described above, the user can quickly inspect it and if necessary expand the visible context, reaching a decision at a low cost in time and bandwidth. If the document is unhelpful, little time has been wasted on download. If it is useful, its utility is discovered fast.

This functionality can be achieved in at least two ways. One is that the web site maintaining the document has a server equipped with jooming functionality, which stores it in a pre-parsed fashion and thus quickly generates an HTML/JavaScript/Flash/etc. version with the required opening state, viewable in a standard web browser. (Storing it as an HTML/etc. page would lack the flexibility of response to particular search terms.) Search term(s) can be passed to this server in the standard HTML manner, as part of the URL.

Alternatively, the jooming method may be embodied on a portal, whose task is to connect users to standard web sites in a manner that adds user value. Such value may be various, such as a promise of scientific merit for pages found through the portal, the absence—or the quality—of explicit sexual images on pages found, improved organisation for finding sites, or whatever else the user perceives as useful. In the case of the present invention, value is a joomed view. If the user clicks or otherwise inputs a URL, the portal downloads the complete page to itself. With proper setup, the portal hardware uses high bandwidth and multiply redundant hardware, so this does not represent the time delay that a complete download to the user would involve. The portal then does a jooming analysis, constructs an HTML/etc. page accordingly, and delivers this small file fast over the user's more limited bandwidth, with added detail delivered in background so that it will often be instantly available when the user interacts with the joomed view to reach it. (We note that the jooming process will significantly alter the page's layout, typically un-picking the table structure that page designers use to force rigidity on what the designers of HTML intended as a display system adaptive to available space. It will also by default tokenize images, to save both layout space and bandwidth. This will not please designers who have stayed up late tweaking their layouts, but it will add to their sites' exposure, and the full un-joomed view will in our preferred embodiment remain available with one click to users who wish to see it.)

The joomed display first delivered can be adjusted according to the 'opening view' options discussed above. In particular, the options may include a search term, so that the opening view adapts to showing it. It may be that the portal also runs either a search engine (such as those of Google or Yahoo), or a metasearch engine like www.clusty.com which adds value by clustering the results of queries passed to other sites. For this case we disclose the method by which clicking on a member of the returned list of URLs, in whatever format is preferred for the display of hits, connects the URL with the search term for which the hit was found. The portal then creates for the user an opening joomed view of the page in question that is specific, as discussed above, to that search term.

It is possible for the browser installed on the user's computer to add the capability to display a joomed view of standard pages that it downloads, but this requires that parts less important to the user be downloaded before the browser hides them. They may never be examined, and time and bandwidth are wasted. This is not therefore our preferred embodiment for joomed viewing of documents on the web.

In our currently preferred embodiment of the present invention, the originator of a document does not need to know that it will be subject to a joomed view. (This contrasts with creation of a document specifically to be viewed by a browser, by a particular editing program, etc.) However, as jooming becomes widely used, some creators will wish for tokenization that conveys their intent better than an algorithm's choices. This becomes possible with jooming mark-up, by which a creator includes tokenized versions, suitably tagged, that will be ignored by a browser that does not embody a jooming method or see the page through a jooming portal, but will be displayed where appropriate in a joomed view. The specific tag syntax is a straightforward development task for one skilled in the art, but can best be agreed as the jooming user community develops, rather than specified in the present document. Jooming mark-up may also include the specification of a list of terms that are to be given high priority for inclusion in the joomed version of any text in which they occur. This is analogous to the frequent provision, in technical papers, of a list of keywords. Where an embodiment of the present invention recognizes such a list, it may prioritize them for inclusion where possible in the tokenized forms of text.

Hypertext uses of the invention Despite the hype on hypertext, it often generates a heap in disorder. Following links from page to page, one is easily lost. The "Open in another window" clutters the virtual desktop with windows, and "Open in another tab" merely groups the clutter within one window. Returning to a session that had generated a dozen open tabs, after time away from the computer or using the "Restore crashed session" option available on better browsers, one is faced with many documents. Remembering which pages arose by clicking on links within which other ones, and what their supposed relevance was, becomes a major mental task of mental reconstruction.

Despite the limitations of sequential text, sometimes called 'linear', it has the merit that a context of any part of it is shown directly by contiguity: it is the text that is con (with) the part. It may not be the only relevant context, so that a book chapter on the biomechanics of cloning may need to refer to an ethics chapter elsewhere in the book, as well the nearby-expounded molecular details of chromosomes. The standard digital suggestion is to make all chapters equally close, by the use of hyperlinks. These do make distant context more reachable, even in another document or on another server, but a reader's particular context—how the item relates to that reader's flow of reading and ideas—becomes hidden.

Jooming allows us to retain the flexibility of hypertext with the clarity of sequential exposition. We simply add 'hyperlink node' to the node types already discussed. When in a joomed view the user clicks on such a node, at depth n of the current document, the document found is parsed and its tree added to the current structure. Its root node becomes a depth-n node of this structure, replacing the original hyperlink node. We refer to this as jooming inclusion. In our preferred embodiment it is licit to iterate jooming inclusion, except where it would result in a node being in its own posterity. In this case expansion is blocked, and the link acts as an internal link to the appropriate point in the expanded document.

Jooming data in URLs By default our preferred embodiment opens a document or page with the open display state for its highest node, and its child nodes tokenized, either in a separate space (such as but not limited to a browser window, tab or frame) or in a jooming inclusion. However, a URL may take the form http://www.ooohhhh/wow.html#rad, where the "rad" specifies that a browser is to open the page "wow.html" at the point where it has an anchor tag such as <a name="rad">egads!</a>. The preferred embodiment of our jooming method then finds this tag, identifies the deepest node whose specified text includes it, and opens as though "egads!" were a search hit as described above under "Search views".

As this example illustrates, the flexible syntax of URLs makes it as easy to pass jooming parameters that give the desired display state of the nodes in the target as to pass search terms, labels, user identities, and a host of other data currently communicated by this channel. A link can thus control in detail the joomed view that a user click on it will lead to, whether displayed in a separate space or via jooming inclusion. A standard syntax for thus passing jooming parameters (to be used by a browser or portal that embodies jooming, while ignored by others) can best be agreed as the jooming user community develops, rather than specified in detail in the present document.

Figure 18:
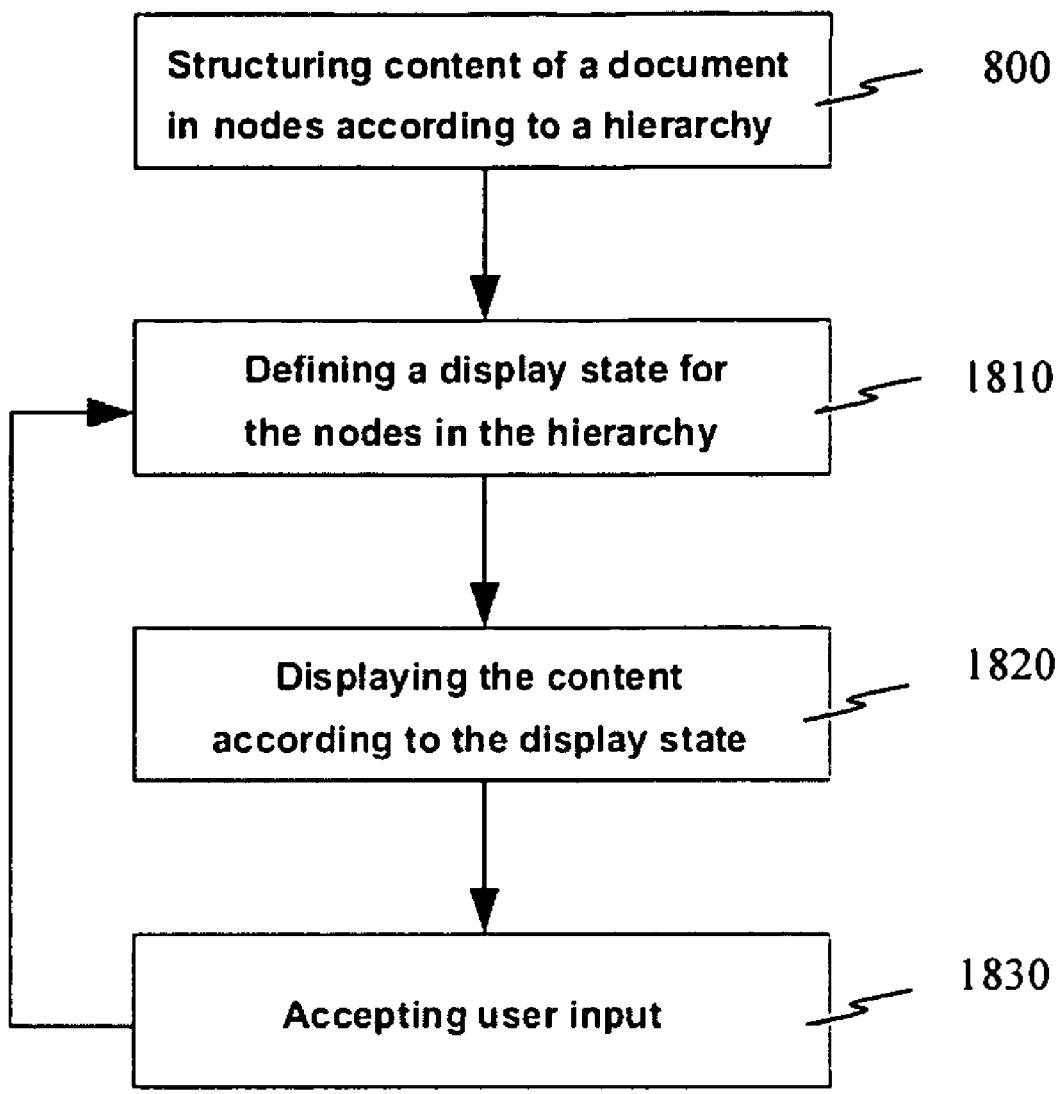

In FIG. 18 a schematic flow chart of an embodiment of the invention is disclosed. In step 1800 content of a document is structured in nodes according to a hierarchy. In step 1810, a display state for the nodes in the hierarchy is defined, and in step 1820, the content according to the display state is displayed on a screen or the like.

Scope and Ambit of the Invention

The method disclosed enables the display of a document in a unitary abbreviated form reflecting the hierarchical structure given to it either by tagging or by typographical convention, where the degree of abbreviation varies from place to place under user control. Any part is readable in detail when progressively expanded by the user. This makes possible a number of useful features:

Navigation of text by content landmarks, from page level to volume level.
  Rapid view of what material is addressed in the document
  Clear overview of the developing structure of an edited document
  Automated transition from typographical to standards-compliant sectioning
  Structured contextual view of search results in the document
  Rapid navigation to information of interest, by search or context
  Connected display of distinct parts of the document, without separate windows
  Display of both source and target in distance 'cut and paste', without separate windows
  Document opening with a degree of displayed detail responsive to available space
  Web download of only what is needed while navigating within the document
  Background download of additional detail, while the user thinks and chooses
  Browser display of a mutably abbreviated view, in a browser with no added plug-in
  Web document opening with a contextualized focus on a search term
  Web document opening with a contextualized focus on a target anchor
  Web document opening in a structured display determined by the link URL
  Web author input into the abbreviation can be supported, but not demanded
  Display of all or part of a document within another document that links to it.

The invention relates to a computerized method for unitary display of a document at user-selectable levels of detail that may vary within the said document, that when run on a processor comprises the steps of a) Identifying a hierarchy containing: sections at one or more depths, paragraphs, sentences, and optionally some or all among lists, substructures of sentences, words, included images, animations, videos, applets, sound files and hypertext links;
  b) Defining an open form for each node of the said hierarchy;
  c) Defining a tokenized form for each node of the said hierarchy;
  d) Attaching a display state to each node of the said hierarchy;
  e) Displaying the content of each of the said nodes in tokenized or open form, or leaving them invisible, according to the value of the said display state;
  f) Enabling user modification of the display states, and hence of the said display of content.

In an embodiment the hierarchy is stored as a 'tree' data structure.

In an embodiment the hierarchy is derived from hierarchical data within the input file.

In an embodiment the hierarchy is derived from typographical data in the input file.

In an embodiment the typographical data are implicit in a scanned view of the document, and made explicit by optical character recognition.

In an embodiment the hierarchy is stored by mark-up within sequential storage of the document contents.

In an embodiment the open form for a leaf node is the normal uncompressed display of the content associated with that node.

In an embodiment the open form for a node with children is the display of the content associated with the said children, according to their current display state.

In an embodiment the tokenized form is provided by mark-up within the document.

In an embodiment the tokenized form is defined algorithmically.

In an embodiment the tokenized form consists of initial and optionally final words from the text associated with the node.

In an embodiment each word and node is assigned a landmark value.

In an embodiment the tokenized form for a sentence includes words assigned high landmark value.

In an embodiment the tokenized form for a node includes tokenized forms of nodes assigned high landmark value.

In an embodiment the landmark value is raised for a word near a sentence break.

In an embodiment landmark value is raised, less than near a sentence break, for a word near a colon.

In an embodiment the landmark value is raised, by less than for a word near a colon, for a word near a semi-colon.

In an embodiment the landmark value rises with rarity of the word or words.

In an embodiment the landmark value is raised by syntactic or structural analysis of the sentence containing the word or words.

In an embodiment the landmark value is raised by typographical indicators.

In an embodiment the landmark value is raised by capitalization.

In an embodiment the landmark value is raised by the word or words being associated with a hypertext link.

In an embodiment the landmark value that qualifies a word or node for inclusion is adjusted according to the available space for display.

In an embodiment the tokenized form additionally includes text identifiable as a title for the text corresponding to the node.

In an embodiment a node that has exactly one child has a tokenized or open form that is respectively the tokenized or open form of the child, with the addition of any title associated with the said node.

In an embodiment a paragraph identified as an Abstract is assigned a more extensive tokenized form.

In an embodiment an image node is assigned a lower resolution image as a tokenized from.

In an embodiment the image node is assigned an additional node as a child, whose tokenized form is an intermediate resolution image to be shown when the said image node is in the open display state.

In an embodiment the additional node is itself assigned such an additional node, and this is repeated one or more times.

In an embodiment the tokenized form of an animation, video or applet node is a low resolution image.

In an embodiment said image is algorithmically constructed as a low resolution image of the opening or otherwise selected frame of the open form of the said node.

In an embodiment said image is provided within the document and marked by an appropriate tag.

In an embodiment a sound node in the tokenized display state plays an extract, optionally at lower fidelity, when touched by the cursor or when clicked on.

In an embodiment any tokenized node whose display region the cursor moves across becomes open, and closes when it leaves.

In an embodiment the closing is prevented if the 'Control' or 'Command' key or another key is held down.

In an embodiment another key or button is used to force closing.

In an embodiment the motion of the mouse across a node's display region in one direction triggers opening, while motion in another direction triggers closing.

In an embodiment the turning the mouse scroll wheel in one direction opens the deepest node whose display region the cursor currently occupies, turning it in the other closes it.

In an embodiment clickable 'grow' or 'shrink' buttons are attached to the displayed forms of tokenized and open nodes respectively.

In an embodiment a 1D widget such as a scroll or slider bar, as a fixed control or a tool tip, controls the depth of display at a currently chosen point.

In an embodiment the widget use is combined with the effects of moving into, over or out of a node's display region.

In an embodiment the input includes left and right turning motion, which respectively open and close (or vice versa) the node whose display area contains the cursor.

In an embodiment the input consists of detected user attention to a particular region of text.

In an embodiment the user attention is detected by the use moving a pointing device over the display.

In an embodiment user attention is detected via the lingering of a cursor.

In an embodiment user attention is detected by cameras observing the user's eye movements.

In an embodiment the cursor is moved by a device detecting brain waves or another volitional activity of the user.

In an embodiment the effect is achieved in a standard browser by inclusion of mouse activity response code.

In an embodiment the effect applies to a previously selected plurality of nodes.

In an embodiment a 1D widget such as a scroll or slider bar controls the depth of display throughout the text.

In an embodiment the opening view uses display states invisible or tokenized those nodes not containing a search term or terms.

In an embodiment the search term or terms are highlighted within the tokenized or open form of the deepest visible nodes that contain them.

In an embodiment the deepest visible nodes that contain search terms are marked with numbers or icons that indicate how many such terms they contain.

In an embodiment the opening view uses display states invisible or tokenized those nodes not containing a change relative to another document.

In an embodiment the change or changes relative to the said other document are highlighted within the tokenized or open form of the deepest visible nodes that contain them.

In an embodiment the deepest visible nodes that contain the change or changes relative to said other documents are marked with numbers or icons that indicate how many such changes they contain.

In an embodiment the opening view is specified by a maximum depth.

In an embodiment the opening view is specified by a maximum display size.

In an embodiment the opening view is a display to the maximum depth that can uniformly be shown within the specified display size.

In an embodiment the opening view is a display of non-uniform depth, with lower display priority given to a text node that has a longer ancestry.

In an embodiment said maximum display size is the display area currently available, using the current font.

In an embodiment information added to a URL controls the opening view.

In an embodiment the view is used to display editing changes.

In an embodiment the web site maintaining a document responds to a search request by providing a search view as stated above.

In an embodiment a portal combining the capability to perform the said steps with the capability to search or metasearch the web, in response to a user selecting a particular hit, provides a search view as stated above.

In an embodiment a web site or portal delivers first an abbreviated version of a document, which the user may inspect and request more detail.

In an embodiment the posterity of currently visible nodes is downloaded in background while the user examines the display of the said nodes.

In an embodiment the document already contains annotation to assist in defining the said hierarchy.

In an embodiment document already contains annotation to assist in defining the said tokenized forms.

In an embodiment a hypertext link is used to graft all or part of another document's hierarchy to the hierarchy of the currently open document.

In an embodiment the nodes of the enlarged hierarchy appear as a single document.

In an embodiment the hierarchy, tokenized forms, landmark value, low resolution image animation, video, applet, or extract sound files are stored within a newly saved version of the file or in association with it.

In an embodiment a computer program product is configured to perform the method of the above when executed on a computer.

In an embodiment an electronic document comprising a hierarchy of nodes produced according to the above.

In an embodiment the display is shown to the user on a desk-top computer display.

In an embodiment the display is shown to the user on a lap-top computer display.

In an embodiment the display is shown to the user on a hand-held computer display, such as a cellular phone, PDA, or the like.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

What is claimed is:

1. A computerized method for displaying content that is contained within a document, the method, executing on a processor, comprising:
    identifying textual content within the document according to a hierarchy, the hierarchy defined by a plurality of nodes that are each respectively associated with a portion of the textual content, the plurality of nodes including a first node associated with a first portion of the textual content and a second node that is associated with a second different portion of the textual content and is also a child of the first node, the second node being a leaf node;
    assigning a visualization form out of a plurality of visualization forms to each one of the plurality of nodes, the plurality of visualization forms including at least an open form, a tokenized form, and an invisible form;
    displaying the portion of textual content that is associated with the respective node based on the assigned visualization form; and
    updating the visualization form of at least one of the plurality of nodes based on user input,
    wherein the textual content of the second node is not displayed when the visualization form for the second node includes the invisible form,
    wherein less than a full amount of the textual content associated with the second node is displayed when the visualization form for the second node includes the tokenized form, and
    wherein the textual content associated with the second node is displayed when the visualization form for the second node includes the open form.

2. A method according to claim 1, wherein the hierarchy is stored by mark-up within sequential storage of the document contents.

3. A method according to claim 1, wherein the tokenized form is provided by mark-up within the document.

4. A method according to claim 1, wherein the user input includes a user action having a pointer cross the display of a node, in one direction changes the visualization form of the node in one direction, while motion in another direction changes the visualization form in the opposite direction.

5. A method according to claim 1, where each word and/or node is assigned a landmark value and the tokenized form is based on the assigned landmark value of the words and/or nodes.

6. A method according to claim 1, wherein the user input comprises arranging interactive areas on the display to be activated in order to control the depth of display at a currently chosen point.

7. A method according to claim 1, wherein the user input further comprises a user inputting a search term and the content of the document is displayed using the invisible form or the tokenized form for a node that does not contain a search term.

8. A method according to claim 7, wherein the search term is highlighted within the tokenized or open form of the deepest visible nodes that contain the search term.

9. A method according to claim 1, where an opening view of the document uses invisible or tokenized forms for those nodes not containing a change relative to another document that has been compared to said document.

10. A method according to claim 9, where the change or changes relative to the other document are highlighted within the tokenized or open form of the deepest visible nodes that contain the change or changes.

11. A method according to claim 1, wherein the node comprises sections, paragraphs, sentences, and optionally some or all among lists, substructures of sentences, words, included images, animations, videos, applets, sound files and hypertext links.

12. A non-transitory digital storage medium storing a computer program for use with a computing system, the computer program, when executed on a the computing system, configured to:
    identify textual content according to a hierarchy, the hierarchy including by a plurality of nodes that are each respectively associated with a portion of the textual content, the plurality of nodes including a first node associated with a first portion of the textual content and a second node that is associated with a second different portion of the textual content and is also a child of the first node, the second node being a leaf node,
    assign a visualization form from a plurality of visualization forms to each one of the plurality of nodes, the plurality of visualization forms including at least an open form, a tokenized form, and an invisible form;
    display the portion of textual content that is associated with the respective node based on the assigned visualization form; and
    update the visualization form of at least one of the plurality of nodes based on user input,
    wherein the textual content of the second node is not displayed when the visualization form for the second node includes the invisible form,
    wherein less than a full amount of the textual content associated with the second node is displayed when the visualization form for the second node includes the tokenized form, and
    wherein the textual content associated with the second node is displayed when the visualization form for the second node includes the open form.

13. The medium of claim 12, wherein the hierarchy is stored by mark-up within sequential storage of the document contents.

14. The medium of claim 12, wherein the open form for a leaf node comprises the normal uncompressed display of the textual content associated with that-the respective node.

15. The medium of claim 12, wherein user input further comprises a user action having a pointer cross the display of a node, in one direction changes the visualization form of the node in one direction, while motion in another direction changes the visualization form in the opposite direction.

16. The medium of claim 12, wherein the user input comprises arranging interactive areas on the display to be activated to control the depth of display at a currently chosen point.

17. A non-transitory computer readable storage medium storing an electronic document that is to be processed by a computing system, the electronic document comprising:
- textual content that is set to be displayed by the computing system according to a hierarchy that contains a plurality of nodes, each one of the plurality of nodes having at least one of a plurality of visualization forms, the plurality of visualization forms including at least an open form, a tokenized form, and an invisible form,
- the plurality of nodes including a first node associated with a first portion of the textual content and a second node that is associated with a second different portion of the textual content and is also a child of the first node, the second node being a leaf node of the hierarchy,
- each one of the plurality of nodes having a value that is set to indicate the at least one of the plurality of visualization forms,
- wherein the textual content of each one of the plurality of nodes is set to be displayed according to the value that indicates the visualization form,
- wherein the value of each one of the plurality of nodes is set to be modified by a user,
- wherein the textual content of the second node is not displayed by the computing system when the visualization form for the second node includes the invisible form,
- wherein less than a full amount of the textual content associated with the second node is displayed by the computing system when the visualization form for the second node includes the tokenized form, and
- wherein the textual content associated with the second node is displayed by the computing system when the visualization form for the second node includes the open form.

18. The medium of claim 17, wherein display of the electronic document is set to comprise areas arranged to change the display state when indicated by a user.

19. The medium of claim 17, wherein the electronic document is set to be displayed on a standard computer interface.

20. The medium of claim 17, wherein the electronic document is set to be displayed on a hand-held device.

21. A method for hierarchically structuring textual content of a document, the method, when performed on a processor, comprising:
- structuring the textual content into a plurality of nodes in a hierarchy, the plurality of nodes including a first node associated with a first portion of the textual content and a second node that is associated with a second different portion of the textual content and is also a child of the first node, the second node being a leaf node,
- defining a display state for each one of the plurality of the nodes in the hierarchy, the display state selected from a plurality of display states that include an open state, a tokenized state, and an invisible state; and
- displaying the textual content according to the display state on a display,
- wherein the textual content of the second node is not displayed when the display state for the second node includes the invisible form,
- wherein less than a full amount of the textual content associated with the second node is displayed when the display state for the second node includes the tokenized form, and
- wherein the textual content associated with the second node is displayed when the display state for the second node includes the open form.

\* \* \* \* \*